US011696112B2

(12) United States Patent
Xin et al.

(10) Patent No.: US 11,696,112 B2
(45) Date of Patent: Jul. 4, 2023

(54) TS OPERATION FOR RTA SESSION MANAGEMENT

(71) Applicant: SONY GROUP CORPORATION, Tokyo (JP)

(72) Inventors: Liangxiao Xin, San Jose, CA (US); Mohamed Abouelseoud, San Francisco, CA (US)

(73) Assignee: SONY GROUP CORPORATION, Tokyo (JP)

(*) Notice: Subject to any disclaimer, the term of this patent is extended or adjusted under 35 U.S.C. 154(b) by 67 days.

(21) Appl. No.: 16/922,988

(22) Filed: Jul. 7, 2020

(65) Prior Publication Data

US 2021/0306271 A1    Sep. 30, 2021

Related U.S. Application Data

(60) Provisional application No. 63/002,740, filed on Mar. 31, 2020.

(51) Int. Cl.
| | | |
|---|---|---|
| *H04W 8/04* | (2009.01) | |
| *H04L 47/6275* | (2022.01) | |
| *H04W 28/24* | (2009.01) | |
| *H04W 74/08* | (2009.01) | |

(Continued)

(52) U.S. Cl.
CPC .......... *H04W 8/04* (2013.01); *H04L 47/2416* (2013.01); *H04L 47/6275* (2013.01); *H04W 28/24* (2013.01); *H04W 74/0816* (2013.01); *H04W 84/12* (2013.01)

(58) Field of Classification Search
CPC . H04L 47/14; H04L 47/2416; H04L 47/6275; H04W 28/24; H04W 74/0816; H04W 84/12; H04W 24/08; H04W 76/15
See application file for complete search history.

(56) References Cited

U.S. PATENT DOCUMENTS

| | | | |
|---|---|---|---|
| 2016/0227467 A1* | 8/2016 | Tomici | H04W 8/18 |
| 2021/0075675 A1* | 3/2021 | Cavalcanti | H04W 8/22 |

FOREIGN PATENT DOCUMENTS

| | | |
|---|---|---|
| CN | 109587052 A | 4/2019 |
| CN | 110809295 A | 2/2020 |

OTHER PUBLICATIONS

Lopez-Perez, David et al., "IEEE 802.11be Extremely High Throughput: The Next Generation of Wi-Fi Technology Beyond 802.11ax", in IEEE Communications Magazine, vol. 57, No. 9, pp. 113-119, Sep. 2019, doi: 10.1109/MCOM.001.1900338, Sep. 27, 2019, downloaded from https://arxiv.org/pdf/1902.04320.pdf.

(Continued)

*Primary Examiner* — Eric Myers
(74) *Attorney, Agent, or Firm* — O'Banion & Ritchey LLP; John P. O'Banion

(57) ABSTRACT

A wireless local area network (WLAN) station and protocol configured to support communicating real-time application (RTA) packets that are sensitive to communication delays as well as non-real time packets over a network supporting within traffic stream (TS) operations in which real time application (RTA) traffic and non-RTA traffic coexist. Stations can request establishing a traffic stream from neighboring stations, which can accept or deny the TS for the RTA stream. Additional information can be passed in requesting the stream or by the responder for denying the stream.

20 Claims, 11 Drawing Sheets

(51) Int. Cl.
*H04W 84/12* (2009.01)
*H04L 47/2416* (2022.01)

(56) References Cited

OTHER PUBLICATIONS

Dave Cavalcanti (Intel Corporation): "Low latency service in 802. IIbe", IEEE Draft; 11-20/0418-01-00Be-Low-Latency-Service-in-802.11be, IEEE-SA Mentor, Piscataway, NJ USA, vol. 802.11 EHT; 802.IIbe, No. 1, Mar. 14, 2020 (Mar. 14, 2020), pp. 1-13, XP068167043.
Kate Meng (Tencent Technology (Shenzhen) Company Limited): "RTA TIG summary and recommendations", IEEE Draft; 11-19-0065-06-0RTA-RTA-TIG-Summary-and-Rec Ommendations, IEEE-SA Mentor, Piscataway, NJ USA, vol. 802.11 RTA, No. 6, Mar. 13, 2019 (Mar. 13, 2019), pp. 1-14, XP068148202.
Kazuyuki Sakoda (Sony): "Thoughts on RTA development", IEEE Draft; 11-18-1972-07-Orta-Thoughts-on-RTA-Develop Ment, IEEE-SA Mentor, Piscataway, NJ USA, vol. 802.11 RTA, No. 7, Nov. 15, 2018 (Nov. 15, 2018), pp. 1-18, XP068133468.

\* cited by examiner

FIG. 1 (Prior Art)

| Element ID | Length | TS Info | Nominal MSDU Size | Maximum MSDU Size | Minimum Service Interval | Maximum Service Interval | Inactivity Interval | Suspension Interval |
|---|---|---|---|---|---|---|---|---|

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|

FIG. 2 (Prior Art)

| Traffic Type | TSID | Direction | Access Policy | Aggregation | APSD | User Priority | TSInfo Ack Policy | Schedule | Reserved |
|---|---|---|---|---|---|---|---|---|---|

FIG. 3 (Prior Art)

| Element ID | Length | User Priority | Frame Classifier |
|---|---|---|---|

FIG. 4 (Prior Art)

| Element ID | Length | Processing |
|---|---|---|

FIG. 7 — Element 50:
| Element ID | Length | RTA-TS Info | Nominal MSDU Size | Maximum MSDU Size | Minimum MSDU Size | Mean Data Rate | Peak Data Rate | Burst Size |
| --- | --- | --- | --- | --- | --- | --- | --- | --- |

| Service Start Time | Service End Time | Inactivity Interval | MSDU Lifetime | Deterministic Service | Delay Bound | Reliability | Jitter | Nominal Service Interval |
| --- | --- | --- | --- | --- | --- | --- | --- | --- |

| Minimum Service Interval | Maximum Service Interval | Minimum PHY Rate | Surplus Bandwidth Allowance | Medium Time |
| --- | --- | --- | --- | --- |

FIG. 8 — Element 70:
| Traffic Type | TSID | Direction | Access Policy | Aggregation | APSD | RTA Priority | TSInfo Ack Policy | Retry Policy | Schedule | Reserved |
| --- | --- | --- | --- | --- | --- | --- | --- | --- | --- | --- |

TS OPERATION FOR RTA SESSION MANAGEMENT

CROSS-REFERENCE TO RELATED APPLICATIONS

This application claims priority to, and the benefit of, U.S. provisional patent application Ser. No. 63/002,740 filed on Mar. 31, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating a combination of real time and non-real time traffic.

2. Background Discussion

One of the most utilized forms of wireless medium access control protocol (MAC) is called Carrier Sense Multiple Access/Collision Avoidance (CSMA/CA) which is utilized for carrier transmission in IEEE 802.11 networks. Unlike its counterpart called Carrier Sense Multiple Access/Collision Detect (CSMA/CD) which deals with transmissions after a collision has occurred, CSMA/CA acts to prevent collisions before they arise.

Current wireless technologies using CSMA/CA are directed at high throughput network performance but do not provide low latency capabilities. However, a large number of applications, such as real time applications (RTA), require low latency communications and are underserved by the existing technology.

The RTAs require low latency communication and uses best effort communication. The data generated from the RTA is referred to herein as RTA traffic and will be packetized as RTA packets at the transmitter STA. Conversely, the data generated from the non-time sensitive application is referred to herein as non-RTA traffic and is packetized as non-RTA packets at the transmitter STA.

The RTA packet requires low latency due to its need of high timeliness on packet delivery. A timeliness requirement sets a certain period of time for packet delivery which assures that the RTA packet is still valid when it is delivered.

Current wireless communication systems using CSMA/CA do not identify the RTA packet and non-RTA packet, and they fail to fully address achieving low-latency communications for RTA packets, while still being able to maintain high throughput levels for non-RTA traffic.

Current IEEE 802.11 protocols allow an STA to set up a Traffic Stream (TS) to identify a set of MAC Service Data Unit (MSDUs) under the same traffic specification and Quality-of-Service (QoS) requirement. However, they cannot represent a set of MSDUs under an RTA session, and thus cannot fully support RTA sessions.

Accordingly, a need exists for an apparatus and method for providing low latency performance for RTA packets, even within traffic streams (TSs). The present disclosure fulfills that need and provides additional benefits over previous technologies.

BRIEF SUMMARY

A wireless communication circuit, method and protocol for communicating over a wireless local area network (WLAN) while still being able to support Carrier Sense Multiple Access/Collision Avoidance (CSMA/CA), and similar mechanisms, and in which real time application (RTA) traffic and non-RTA traffic coexist. The disclosed technology provides improved support for Real Time Applications (RTAs), including traffic streams. The proposed technology is configured to be compatible with existing TS operations under current IEEE 802.11 protocols. By adding additional information exchange during a TS setup procedure, the TS is able to represent an RTA session. Then, it is possible for a STA to identify the RTA packets by comparing the TS information, and to schedule those RTA packet transmissions to satisfy Quality-of-Service (QoS) requirements.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a Traffic Specification (TSPEC) element as found in the IEEE 802.11 protocol.

FIG. 2 is a data field diagram of a Traffic Stream (TS) information element as found in the IEEE 802.11 protocol.

FIG. 3 is a data field diagram of a Traffic Classification (TCLAS) element as found in the IEEE 802.11 protocol.

FIG. 4 is a data field diagram of a Traffic Classification (TCLAS) processing element as found in the IEEE 802.11 protocol.

FIG. 7 is a data field diagram of an RTA-TSPEC element according to at least one embodiment of the present disclosure.

FIG. 8 is a data field diagram of an RTA-TS element according to at least one embodiment of the present disclosure.

DETAILED DESCRIPTION

1. Introduction

Figure 5:
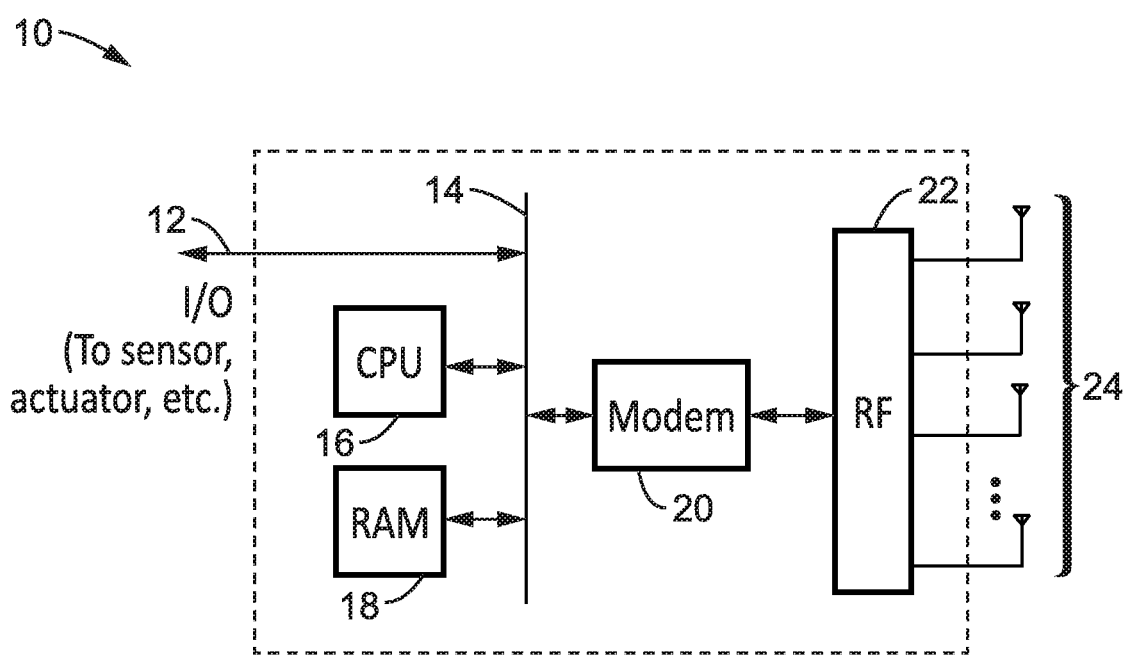
FIG. 5 is a block diagram of station (STA) hardware according to at least one embodiment of the present disclosure.

In existing wireless communications systems there is a substantial tradeoff to be made between high throughput levels and low latency performance. In order to satisfy the different requirements of RTA packet and non-RTA packet, many networks can benefit from having features which improve low latency performance when transmitting RTA packets, or other features toward maximizing throughput when transmitting non-RTA packets.

First, the RTA traffic and non-RTA traffic should be identified by the transmitter STA, while in many cases the receiver STA can also benefit from discerning between an RTA packet and a non-RTA packet. It should be appreciated that discerning between RTA packets and non-RTA packets can be performed in a number of ways without departing from the teachings of the present disclosure, many of which having been described in previous patent applications by Sony. By way of example and not limitation, RTA packets can be discerned from non-RTA packets based on header information from the upper layers, such as the TCP/UDP port numbers, source IP address, destination IP address, type of service and so on. This then allows the network to choose different features toward separately meeting the requirements of both RTA and non-RTA traffic.

It should be appreciated that typically RTAs generate traffic periodically, as a form of connection-oriented communication. RTA connection-oriented communication established by an application between STAs is called an RTA session. It is possible that a STA can have multiple RTA sessions in the network, and must manage those RTA sessions properly.

1.1. Traffic Stream (TS) Operation

This section introduces several elements that are used for TS setup in IEEE 802.11. In IEEE 802.11, a Traffic Stream (TS) represents a set of MAC Service Data Units (MSDUs) under the same traffic specification and Quality-of-Service (QoS) requirement. It will be noted that MAC stands for Medium Access Communication (MAC). Under IEEE 802.11, a STA is able to setup a TS between the transmitter STA and receiver STA. Then, it is possible for the transmitter STA and the receiver STA to arrange resources to transmit the packets of the TS and satisfy the Quality-of-Service (QoS) requirement.

1.1.1. TSPEC Element

FIG. 1 depicts contents for a TSPEC element in IEEE 802.11 having the following fields. (a) An element ID field is shown indicating the type of element, herein showing a TSPEC element. (b) A length field is shown indicating the length of the TSPEC element. (c) A TS Information field is shown containing traffic stream information as shown in FIG. 2. (d) A Nominal MSDU Size field is shown indicating the nominal size of MSDUs or A-MSDUs belonging to the TS under this TSPEC. (e) A Maximum MSDU Size field is shown indicating the maximum size of MSDUs or A-MSDUs belonging to the TS under this TSPEC. (f) A Minimum Service Interval field is shown indicating the minimum time between the start time of two successive service periods (SPs). (g) A Maximum Service Interval field is shown indicating the maximum time between the start time of two successive SPs. (h) An Inactivity Interval field is shown for indicating the time without arrival or transmission of a MSDU belonging to the TS before that TS is deleted. (i) A Suspension Interval field is shown indicating the time without arrival or transmission of a MSDU belonging to the TS before the generation of successive QoS(+)CF-Poll is stopped for this TS. (j) A Service Start Time field is shown indicating the start time of the first SP. (k) A Minimum Data Rate field is shown indicating the lowest data rate specified by MAC SAP for transmitting MSDUs or A-MSDUs belonging to the TS under this TSPEC. (l) A Mean Data Rate field is shown indicating the average data rate specified by MAC SAP for transmitting MSDUs or A-MSDUs belonging to the TS under this TSPEC. (m) A Peak Data Rate field is shown indicating the maximum data rate specified by MAC SAP for transmitting MSDUs or A-MSDUs belonging to the TS under this TSPEC. (n) A Burst Size field is shown for indicating the maximum burst of MSDUs or A-MSDUs belonging to the TS under this TSPEC at the peak data rate. (o) A Delay Bound field is shown for indicating the maximum time that a STA is allowed to transmit a MSDU or A-MSDU belonging to the TS under this TSPEC. (p) A Minimum PHY Rate field is shown indicating the lowest PHY rate for transmitting MSDUs or A-MSDUs belonging to the TS under this TSPEC. (q) A Surplus Bandwidth Allowance field is shown containing a ratio value for the bandwidth used for transmitting a MSDU or A-MSDU belonging to the TS under this TSPEC and its retransmissions in relation to the bandwidth used for a transmitting that MSDU or A-MSDU once at the minimum PHY rate. (r) A Medium Time field is shown indicating the time allowed for accessing the medium. (s) A DMG Attributes field is shown which is presented when the TSPEC is applied to a directional multi-gigabit (DMG) BSS.

FIG. 2 depicts the content of a TS Info element having the following fields. (a) A Traffic Type field specifies whether the traffic is periodic or not. (b) A TSID field indicates the ID number to identify the TS. (c) A Direction field specifies the direction of data transmission. (d) An Access Policy field specifies the method to be used in gaining channel access. (e) An Aggregation field specifies whether the aggregation schedule is required. (f) An APSD field indicates whether the automatic PS delivery is to be utilized. (g) A User Priority field indicates user priority of the MSDU or A-MSDU belonging to the TS. (h) A TSInfo ACK Policy field indicates whether an acknowledgement (ACK) is required and which form of ACK is to be used. (i) A Schedule field indicates the type of schedule.

1.1.2. TCLAS Element

FIG. 3 depicts the content of a TCLAS element having the following fields. (a) An Element ID field indicates the type of element, which in this example indicates this is TCLAS element. (b) A Length field indicates the length of the TCLAS Element. (c) A User Priority field indicates the user priority from the upper layer. (d) A Frame Classifier field indicates the method for classifying the frames from the upper layer.

1.1.3. TCLAS Processing Element

FIG. 4 depicts the contents in the TCLAS Processing element having the following fields. (a) An Element ID field indicates the type of element, here it would indicate that this is a TCLAS Processing element. (b) A Length field indicates the length of the TCLAS Processing element. (c) A Processing field indicates the method of classifying the traffic from the upper layer when multiple TCLAS elements exist.

The present disclosure is configured to extend 802.11 functionality to provide improved efficiency in handling both RTA and non-RTA communications.

2. Problem Statement and Contribution

Conventional wireless communication systems using CSMA/CA do not identify and differentiate between an RTA packet and a non-RTA packet. The objectives differ for these forms of traffic, with the objective for transmitting RTA packets being low latency communication while the objective for non-RTA packets is high throughput over the network.

Often, RTAs generate traffic periodically as connection-oriented communication. RTA connection-oriented communication established by an application between STAs is called an RTA session. It is possible for a STA to maintain multiple RTA sessions in the network, and it must be able to manage those RTA sessions properly.

Current IEEE 802.11 protocols allow a STA to set up a TS to identify a set of MSDUs under the same traffic specification and QoS requirement. However, it cannot represent a set of MSDUs under an RTA session due to the lack of information during the TS setup procedure.

The proposed technology reuses the TS operation from the current IEEE 802.11 protocol, and adds additional information exchange during a TS setup procedure, so that the TS is able to represent an RTA session. Then, it is possible for a STA to identify the RTA packets by comparing the TS information, and to schedule those RTA packet transmissions to satisfy the QoS requirement.

3. Embodiments of the Present Disclosure 3.1. STA Hardware Configuration

FIG. 5 illustrates an example embodiment 10 of a wireless communication circuit, referred to herein as a wireless station, station (STA), or as a node of a communications network. This communication circuit is shown with computer processor (CPU) 16 and memory (RAM) 18 coupled to a bus 14, which is coupled to I/O path 12 giving the STA external I/O, such as to sensors, actuators, applications and so forth. The STA may be configured with a single modem 20 and single radio-frequency (RF) circuitry 22 and associated set of antennas 24, or it may be configured with multiple modems and multiple RF circuits with multiple groups of antennas, without departing from the teachings of the present disclosure. The modem 20 and its RF circuitry 22 and associated antennas 24 are configured for transmitting/receiving data frames with neighboring STAs. The RF module generates and receives physical signals, and incorporates a frequency converter, array antenna controller, and other circuitry for controlling transmission and reception by the RF circuitry over multiple antennas which are controlled to perform beamforming for transmission and reception. In this way, the STA can transmit signals using multiple sets of beam patterns.

Instructions from memory 18 are executed on processor 16 to execute a program which implements the communication protocols, which are executed to allow the STA to perform the functions of a "new STA" (a station attempting to join the network), or one of the STAs already in the network. It should also be appreciated that the programming is configured to operate in different modes (source, intermediate, destination, access point (AP) and so forth); depending on what role it is playing in the current communication context according to the programming associated with the station and following the protocol of the present disclosure. In setting up the traffic stream (TS), it should be appreciated for example that there is an initiator which requests the TS and a responder which receives and reacts to the request. It should also be appreciated that the protocol performed in response to executing instructions by each of these stations, is capable of performing each of these roles.

4.2. STA Topology Example for Consideration

By way of example and not limitation, an example topology is described in this section to simplify understanding of the objectives and operations of the present disclosure. This simple example assumes there are eight STAs in a meeting room across two Basic Service Sets (BSSs). Each STA can communicate with the other STAs in the same BSS. All STAs use CSMA/CA for random channel access. All STAs run (execute) applications which require low latency communication and applications that use best effort communication. The data generated from the application requiring low latency communication is called RTA traffic and will be packetized as RTA packets at the transmitter STA. Also, the data generated from the non-time sensitive application is called non-RTA traffic and will be packetized as non-RTA packets at the transmitter STA. As a consequence, the transmitter STA generates both RTA traffic and non-RTA traffic for communication.

Figure 6:
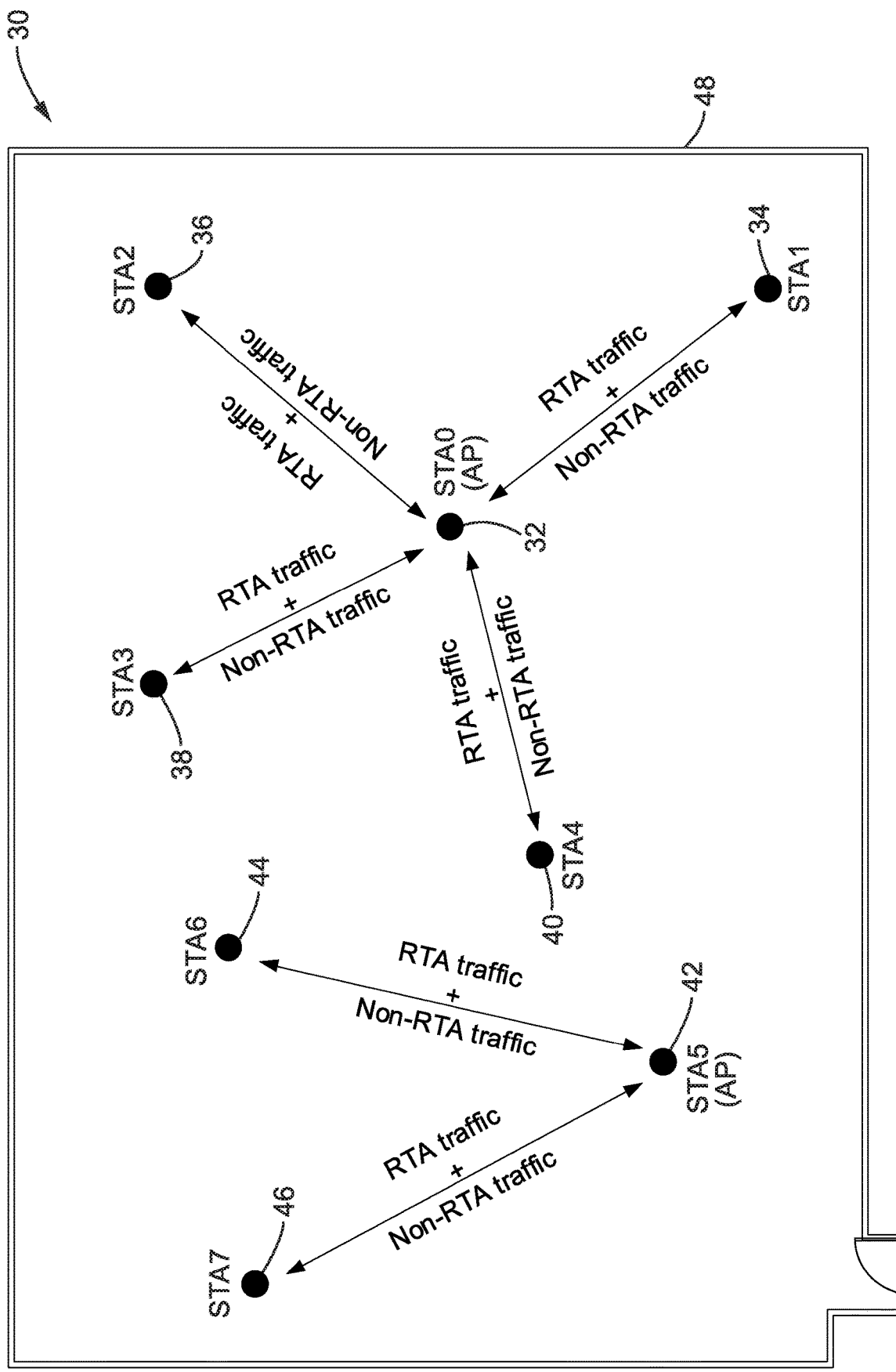
FIG. 6 is a network topology diagram showing a topological example addressed according to at least one embodiment of the present disclosure.

FIG. 6 illustrates an example embodiment 30 of a network topology (scenario) showing STA locations and their transmission links in a given local area 48. A first BSS depicts STA0 32 operating as an access point (AP) and non-AP stations STA1 34, STA2 36, STA3 38 and STA4 40. A second BSS depicts STA5 42 as an AP along with STA6 44, STA7 46.

All the STAs in this example are considered to support both applications requiring low latency communication and applications that utilize best effort communication.

When the STA transmits packets, the STA can follow the regular CSMA/CA scheme.

4.3. RTA-TS Operation for RTA

This section explains how to set up an RTA-TS for an RTA session based on the existing TS operation in IEEE 802.11. Certain TS operations are not described in this section since they can be made identical to the current IEEE 802.11 protocol.

4.3.1. RTA-TSPEC Element

FIG. 7 illustrates an example embodiment 50 of content in the RTA-TSPEC element. The STA which transmits the RTA-TSPEC element during RTA-TS setup procedure is denoted as a transmitter STA. The RTA-TSPEC element has the following fields. (a) An Element ID field indicates the type of element, herein exemplified as an RTA-TSPEC element. (b) A Length field indicates the length of the RTA-TSPEC element. (c) An RTA-TS Info field contains traffic stream information as shown in FIG. 8. (d) A Nominal MSDU Size field can be set by an AP or non-AP STA to indicate the nominal size of MSDUs or A-MSDUs belonging to the TS under this RTA-TSPEC. When an AP receives this field, it could use this field to schedule transmissions to satisfy the QoS requirement of this RTA-TS. By way of example and not limitation, the nominal number of MSDUs or A-MSDUs belonging to the TS under this RTA-TSPEC generated per second can be calculated by Mean Data rate divided by nominal MSDU size; which can be utilized to determine the average overhead (e.g., PLCP preamble, MAC header) that is needed to transmit those MSDUs or A-MSDUs and estimate the total transmission time for that overhead.

(e) A Maximum MSDU Size field can be set by an AP or non-AP STA to indicate the maximum size of MSDUs or A-MSDUs belonging to the TS under this RTA-TSPEC. When an AP receives this field, it can utilize the field to schedule transmissions to satisfy the QoS requirement of this RTA-TS. By way of example and not limitation, the minimum number of MSDUs or A-MSDUs belonging to the TS under this RTA-TSPEC generated per second can be determined from Minimum Data rate divided by maximum MSDU size; which can be utilized to calculate the minimum overhead (e.g., PLCP preamble, MAC header) that is needed to transmit those MSDUs or A-MSDUs and estimate the total transmission time for that overhead. (f) A Minimum MSDU Size field can be set by an AP or non-AP STA to indicate the minimum size of MSDUs or A-MSDUs belonging to the TS under this RTA-TSPEC. When an AP receives this field, it can use this field to schedule transmissions to satisfy the QoS requirement of this RTA-TS. By way of example and not limitation the maximum number of MSDUs or A-MSDUs belonging to the TS under this RTA-TSPEC generated per second can be determined using Maximum Data rate divided by minimum MSDU size; which can be utilized to calculate the maximum overhead (e.g., PLCP preamble, MAC header) that is needed to transmit those MSDUs or A-MSDUs and estimate the total transmission time for those overhead. (g) A Minimum Data Rate field that can be set by an AP or non-AP STA to indicate the lowest data rate specified by MAC Service Access Point (SAP) for transmitting MSDUs or A-MSDUs belonging to the RTA-TS under this RTA-TSPEC. When an AP receives this field, it can use its information to schedule transmissions to satisfy the QoS requirement of this RTA-TS. By way of example and not limitation the minimum amount of data that needs to be transmitted every nominal service interval is given by (Minimum Data Rate*nominal service interval). The minimum transmission time should be arranged by a STA to transmit the minimum amount of data during each nominal service interval.

(h) A Mean Data Rate field can be set by AP or non-AP STA to indicate the average data rate specified by MAC Service Access Point (SAP) for transmitting MSDUs or A-MSDUs belonging to the RTA-TS under this RTA-TSPEC. When an AP receives this field, it can use this information for scheduling transmissions to satisfy the QoS requirement of the RTA-TS. By way of example and not limitation the STA should ensure that it has sufficient available channel resource (e.g., bandwidth) to transmit the data generated at the mean data rate. Stated another way, the available bandwidth should be greater than the mean data rate. (i) A Peak Data Rate field can be set by an AP or non-AP STA to indicate the maximum data rate specified by MAC SAP for transmitting MSDUs or A-MSDUs belonging to the RTA-TS under this RTA-TSPEC. When an AP receives this field, it can use the information from this field to schedule transmissions for satisfying the QoS requirement of this RTA-TS. By way of example and not limitation the maximum amount of data that needs to be transmitted every nominal service interval is (Peak Data Rate*nominal service interval). The transmission time arranged by the STA to transmit the packets belonging to the TS should be less than the time to transmit the maximum amount of data during each nominal service interval. (j) A Burst Size field can be set by an AP or non-AP STA to indicate the maximum burst time that the MSDUs or A-MSDUs belonging to the RTA-TS under this RTA-TSPEC will be continuously generated at the peak data rate. When an AP receives this field, it can use the information from this field to schedule transmissions for satisfying the QoS requirement of this RTA-TS. By way of example and not limitation the current service interval will be shorter when the burst occurs. However, the service interval won't be shorter, such as by more than a value given (peak data rate/minimum data rate−1)*maximum burst size.

(k) A Service Start Time field can be set by an AP or non-AP STA to indicate the start time of the first service period (SP). When an AP receives this field, it can use the information from this field to schedule transmissions for satisfying the QoS requirement of this RTA-TS. By way of example and not limitation a STA can know when a another STA starts to generate the data belonging to the TS under this RTA-TSPEC, because the first service period (SP) should start at a service interval after the Service Start Time. (l) A Service End Time field can be set by an AP or non-AP STA to indicate the time of deleting an RTA-TS. When an AP receives this field, it can utilize the information in this field to schedule transmissions to satisfy the QoS requirement of this RTA-TS. By way of example and not limitation, a STA can determine when the other STA stops generating the data belonging to the TS under this RTA-TSPEC, because there will be no more service periods after the Service End Time. (m) An Inactivity Interval field can be set by an AP or non-AP STA to indicate the amount of time without the arrival or transmission of a MSDU belonging to the RTA-TS before the RTA-TS is deleted. An AP or non-AP STA receiving this field deletes an active RTA-TS if no arrival or transmission of a MSDU belonging to the RTA-TS takes place within the Inactivity Interval.

(n) An MSDU Lifetime field can be set by an AP or non-AP STA to indicate the lifetime of the MSDUs belonging to the RTA-TS under this RTA-TSPEC. If the deterministic service field is set to "1" and a MSDU or A-MSDU is not transmitted successfully within the lifetime which has transpired since it arrived at the MAC layer, then the MSDU or A-MSDU should be dropped. If the traffic is periodic and the STA does not transmit or receive any MSDU or A-MSDU belonging to the RTA-TS under this TSPEC within the MSDU lifetime plus the maximum service interval, then the receiver STA knows that at least one MSDU or A-MSDU is lost. The MSDU Lifetime should be shorter than the Inactivity Interval but longer than the Maximum Service Interval.

(o) A Deterministic Service field indicates whether the TS is generated for an RTA session or not. This field could be as short as a one bit indication, as exemplified. When the TS is generated for an RTA session, then this field is set to a first state, e.g., "1"; otherwise, it is set to a second state e.g., "0". (p) A Delay Bound field indicates the maximum time allowed to transmit a MSDU or A-MSDU belonging to the RTA-TS under this RTA-TSPEC since the arrival of the MSDU or A-MSDU at MAC. Non-AP sets this field to request AP to guarantee the latency of the MSDU or A-MSDU belonging to the RTA-TS under this RTA-TSPEC. An AP receives this field and estimates whether this request can be satisfied or not. An AP sets this field to indicate the delay bound it can provide. When a non-AP STA receives this field, it either accepts the delay bound provided by the AP or renegotiates with the AP. (q) A Reliability field indicates the packet loss requirement of the MSDUs or A-MSDUs belonging to the RTA-TS under this RTA-TSPEC. A Non-AP sets this field to request the AP to guarantee the packet loss of the MSDU or A-MSDU belonging to the RTA-TS under this RTA-TSPEC. An AP receives this field and estimates whether this request can be satisfied or not. An AP sets this field to indicate the packet loss it can provide. When a non-AP receives this field, it either accepts the reliability provided by the AP or renegotiates with the AP.

(r) A Jitter field indicates the jitter requirement of the delivery of the MSDUs or A-MSDUs belonging to the RTA-TS under this RTA-TSPEC. A non-AP sets this field to request the AP to guarantee the jitter requirement of the MSDU or A-MSDU belonging to the RTA-TS under this RTA-TSPEC. An AP receives this field and estimates whether this request can be satisfied or not. The difference between Maximum service Interval and Minimum service Interval should be less than the jitter value to satisfy this request. AP sets this field to indicate the jitter requirements it can provide. When non-AP receives this field, it either accepts the jitter provided by AP or renegotiates with AP. (s) A Nominal Service Interval field indicates the nominal/average time between the start time of two successive SPs. This field is valid when the Traffic Type subfield in the RTA-TS Info is set to a first state, e.g., "1". A non-AP sets this field to request that the AP guarantee the service interval of the MSDU or A-MSDU belonging to the RTA-TS under this RTA-TSPEC. An AP that receives this field can estimate whether this request can be satisfied or not. The AP sets this field to indicate the Nominal service interval it can provide. When a non-AP receives this field, it either accepts the jitter provided by AP or renegotiates with the AP.

(t) A Minimum Service Interval field is set by an AP to indicate the minimum time between the start time of two successive service periods (SPs). A non-AP that receives this field would expect the time between the start time of two successive SPs to be longer than the Minimum service Interval. This field should of course contain a value corresponding to a time interval which is shorter than that given by the Nominal service interval. (u) A Maximum Service Interval field is set by the AP to indicate the maximum time between the start time of two successive SPs. A non-AP which receives this field would expect the time between the start time of two successive SPs to be shorter than the Maximum service Interval. This field should contain an interval value which is larger than the nominal service interval. (v) A Minimum PHY Rate field is set by the AP to indicate the lowest PHY rate for transmitting MSDUs or A-MSDUs belonging to the RTA-TS under this RTA-TSPEC. A non-AP receiving this field would not use PHY rate lower than Minimum PHY rate to transmit MSDUs or A-MSDUs belonging to the RTA-TS under this RTA-TSPEC. (x) A Surplus Bandwidth Allowance field is set by the AP to indicate the ratio of the bandwidth used for transmitting a MSDU or A-MSDU belonging to the TS under this TSPEC and its retransmissions to the bandwidth used for a transmitting that MSDU or A-MSDU once at the minimum PHY rate. A non-AP receiving this field may use the extra bandwidth indicated in the field for its retransmissions. (z) A Medium Time field is set by an AP to indicate the time that is being admitted for accessing the medium for transmitting MSDUs or A-MSDUs belonging to the TS under this TSPEC per a nominal service interval. A non-AP receiving this field would use the medium time for the transmission of MSDUs or A-MSDUs belonging to the TS under this TSPEC per a nominal service interval. This time should guarantee the time for all the MDPUs or A-MSDUs belonging to the TS under this TSPEC generated per nominal service interval being transmitted at minimum PHY rate.

FIG. 8 illustrates an example embodiment 70 of the RTA-TS information subfield, which was contained in the RTA-TSPEC element seen in FIG. 7. This RTA-TS information field contains traffic stream information having the following subfields. (a) A Traffic Type subfield is used by the STA which sets this subfield to a first state, e.g., "1", to indicate the traffic is periodic; otherwise, this subfield is set to a second state, e.g., "0", to indicate that the traffic is not periodic. If a STA receives this subfield setting set to the first state, e.g., "1", with RTA-TSPEC element, it can use the nominal service interval in RTA-TSPEC element to represent the average interval of two successive service periods. (b) A TSID subfield is used by the STA which sets the ID number to identify the RTA-TS. (c) A Direction subfield is used by the STA which sets this subfield to indicate whether the direction of data transmission of the RTA-TS is uplink, downlink, direct link or bidirectional link. If a STA receives this subfield, it only needs to measure the link on the indicated direction for RTA-TS setup.

(d) An Access Policy subfield is used by a STA which sets this subfield to indicate the method of gaining channel access, such as EDCA or other methods. When a STA receives this subfield, it should follow the access policy to gain the channel access for data transmissions of the RTA-TS. (e) An Aggregation subfield indicates if this subfield is valid, which only arises if the schedule field is set to a first state, e.g., "1", and the access policy subfield is set to EDCA, otherwise the field is set to a second state, e.g., "0". This subfield can be as small as a one-bit indication as exemplified, or a larger data structure. If the STA is a non-AP originator of an RTA-TS setup, then it sets this field to a first state, e.g., "1", to request the aggregation schedule, or sets it to a second state, e.g., "0", to not request aggregation schedule; and the receiver STA makes a decision on whether or not to provide this service. If the STA is an AP, it sets this field to a first state, e.g., "1", to provide the aggregation schedule or it sets it to a second state, e.g., "0", to not provide the aggregation schedule and the receiver STA should follow the decision made by the AP.

(f) An APSD subfield provides an indicator, such as a one-bit indication, to show whether the automatic Power Save (PS) delivery is used. When this subfield is set to a first state, e.g., "1", then the automatic PS delivery is utilized for transmitting the MSDU or A-MSDU belonging to the RTA-TS, otherwise it is set to a second state, e.g., "0". (g) An RTA Priority subfield indicates the RTA priority of the MSDU or A-MSDU belonging to the RTA-TS. The RTA priority can be utilized to compare the importance between RTA packets only. It is different from the user priority defined by IEEE 802.1D. All the RTA packets may share the same IEEE 802.1D user priority. (h) A TSInfo ACK Policy subfield indicates whether the Acknowledgement (ACK) is required and which form of ACK is to be utilized. For example, in at least one embodiment it can have options, such as selecting normal ACK, no ACK, or Block ACK (BA). The STA sets this subfield to share this information with other STAs. (i) A Retry Policy subfield indicates how the MSDU or A-MSDU belonging to the RTA-TS will be retransmitted. For example, this field can be implemented as a one-bit indication to show whether the unsolicited retry will be used. The transmitter STA sets this subfield to a first state, e.g., "1", if the unsolicited retry is allowed or otherwise sets it to a second state, e.g., "0". The receiver STA can follow the retry policy.

(j) A Schedule subfield provides an indication, such as a one-bit indication, to show whether the transmission of MSDU or A-MSDU belonging to the RTA-TS is scheduled. The transmitter sets this subfield to a first state, e.g., "1", if the transmission is scheduled, or otherwise sets it to a second state, e.g., "0". The receiver STA is configured to follow the schedule to transmit or receive the MSDU or A-MSDU belonging to the RTA-TS.

When the transmitter STA transmits an RTA-TSPEC element in an ADDRTATS Request frame, it sets the fields in RTA-TSPEC element representing the specification and QoS requirement of the RTA-TS. The transmitter STA is configured to set all the fields in the RTA-TSPEC element except the fields between the Surplus Bandwidth Allowance and Medium Time field. The receiver STA which receives the ADDRTATS Request frame is able to use the parameters of the fields in this element to evaluate whether it has sufficient resources to satisfy the requirement of the RTA-TS. If the requirement can be satisfied, the receiver can accept the RTA-TS setup; otherwise, the receiver STA should reject the RTA-TS setup.

When the transmitter STA transmits an RTA-TSPEC element in an ADDRTATS Response frame and the RTA-TS setup is accepted, the transmitter STA should set all the fields in the RTA-TSPEC element. The parameters of the fields in the RTA-TSPEC element represent the final parameter setting in the RTA-TSPEC element for the RTA-TS between the originator STA and receipt STA.

When the transmitter STA transmits this element in the ADDRTATS Response frame and the RTA-TS setup is rejected with suggested changes, the transmitter STA in at least one embodiment sets all the fields in the RTA-TSPEC element except the fields between the Surplus Bandwidth Allowance and Medium Time fields. The parameters of the fields in the RTA-TSPEC element represent the suggested parameter setting in RTA-TSPEC element of the RTA-TS. The receiver STA can use the suggested RTA-TSPEC element to request another RTA-TS setup.

When the transmitter STA transmits the RTA-TSPEC element in ADDRTATS Reserve Request frame, the parameters of the fields in the RTA-TSPEC element represent the specification and requirement of the RTA-TS requested from the upper layer. The receiver STA should continue the RTA-TS setup procedure and set the same parameters of RTA-TSPEC element in its ADDRTATS Request frame.

Figure 9:
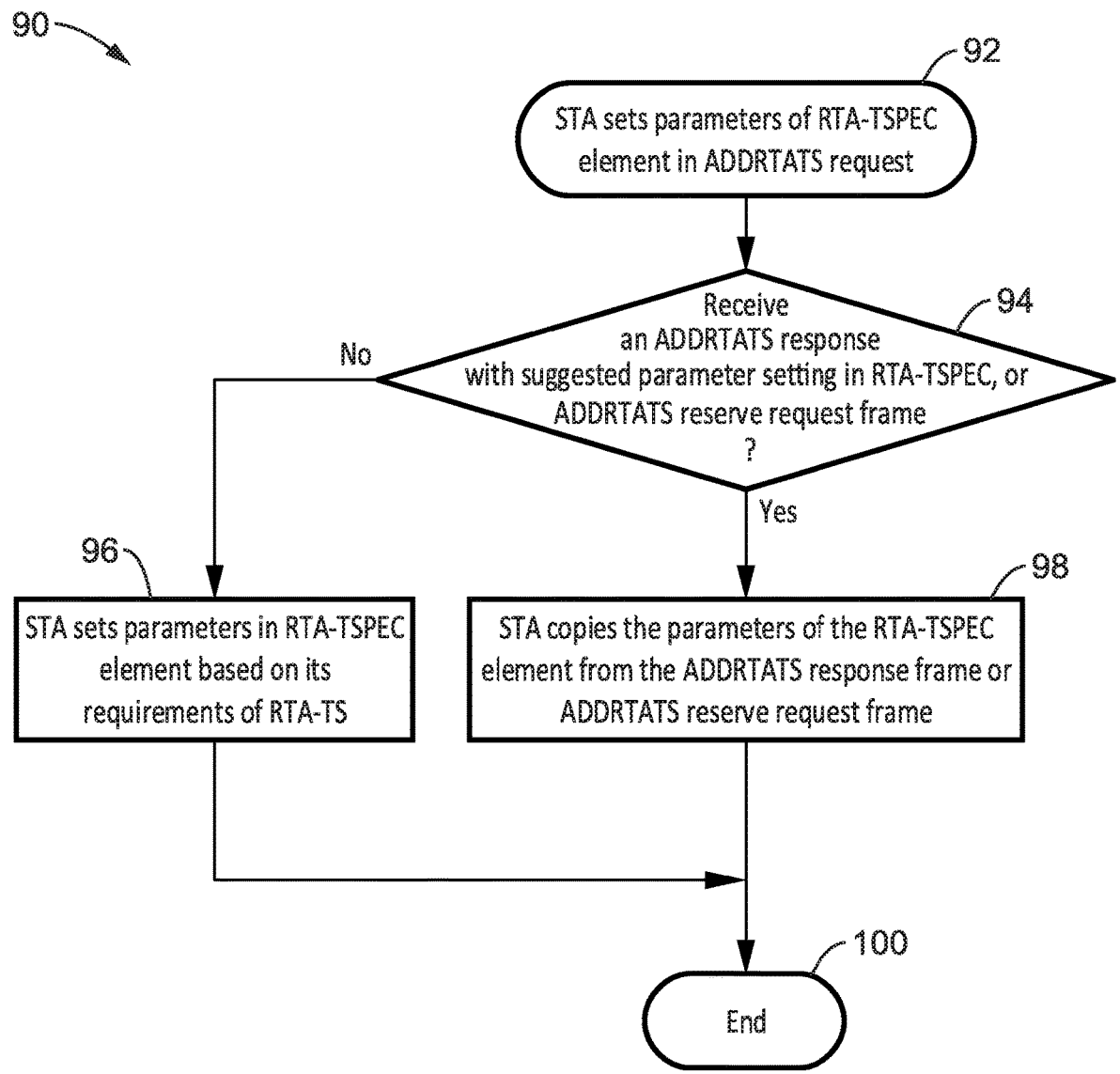
FIG. 9 is a flow diagram of a STA setting parameters in RTA-TSPEC within an ADDRTATS request frame according to at least one embodiment of the present disclosure.

FIG. 9 illustrates an example embodiment 90 of a STA setting the RTA-TSPEC element for the ADDRTATS request frame. Execution commences 92 and a check 94 is made for receiving an ADDRTATS response. If the STA receives an ADDRTATS response frame which rejects the RTA-TS setup but gives a suggested parameter setting of RTA-TSPEC element or an ADDRTATS reserve request frame, then block 98 is reached wherein the STA copies the suggested parameters of RTA-TSPEC element from the ADDRTATS response frame or ADDRTATS reserve request frame to its RTA-TSPEC element in the ADDRTATS request frame. Then, the STA can send an ADDRTATS request frame with the suggested parameters to renegotiate RTA-TS setup. Otherwise, if in block 94 the STA did not receive a response with suggested settings in RTA-TSPEC, then at block 96 the STA sets parameters in the RTA-TSPEC element according to the requirement of RTA-TS. In either case execution ends at block 100.

Figure 10:
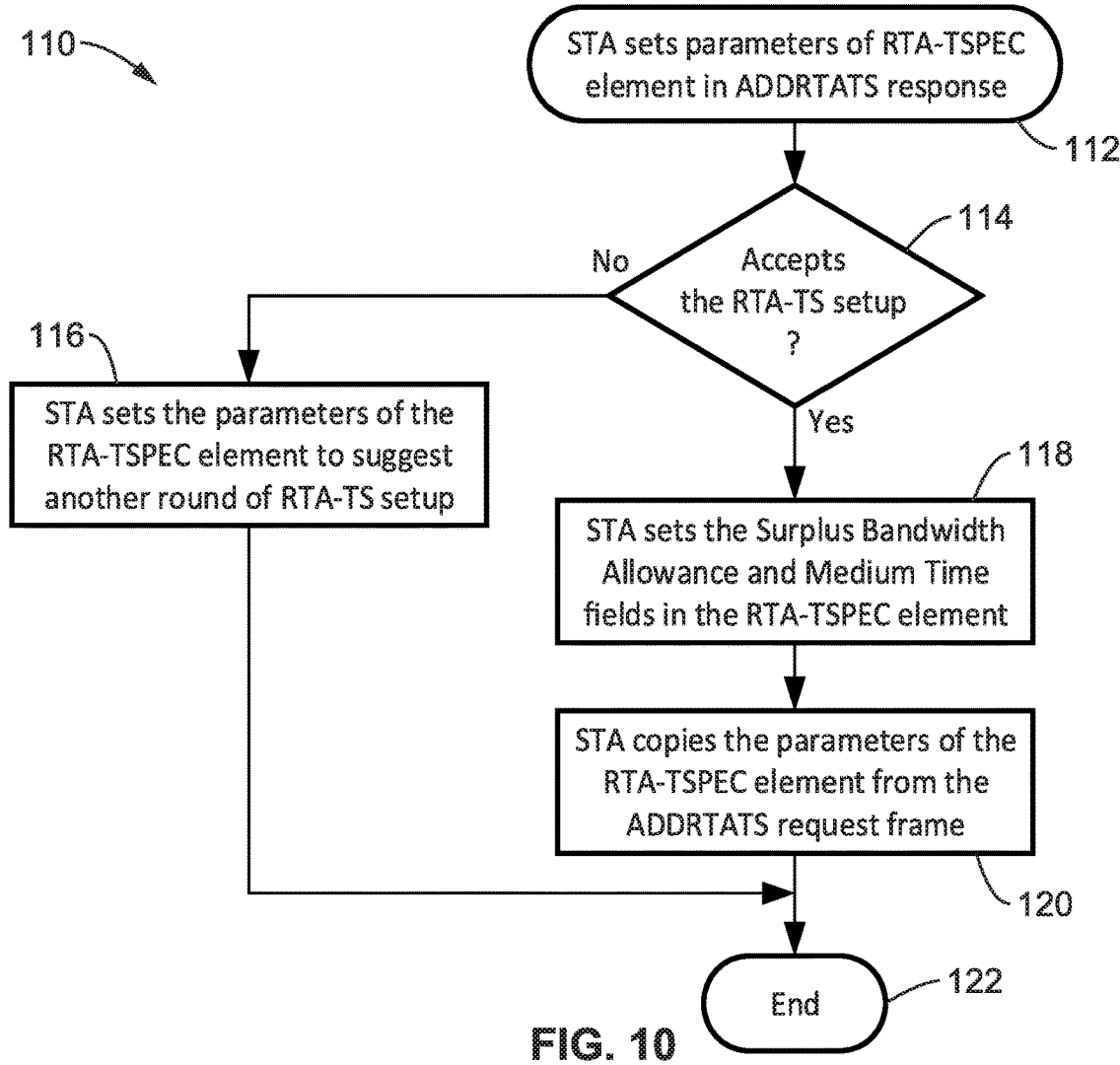
FIG. 10 is a flow diagram of a STA setting parameters in RTA-TSPEC within an ADDRTATS response frame according to at least one embodiment of the present disclosure.

FIG. 10 illustrates an example embodiment 110 of a STA setting the RTA-TSPEC element for ADDRTATS response frame. Execution commences 112 with a check 114 made on whether the RTS-TS is accepted. So when a STA receives an ADDRTATS request frame, it then responds back to this STA with an ADDRTATS response frame to indicate whether the RTA-TS setup is accepted or not. When it sends the ADDRTATS response frame, it sets the parameters of the RTA-TSPEC element in the frame.

If the other station accepted the RTA-TS setup, then block 118 is reached which sets the Surplus Bandwidth Allowance and Medium Time fields in the RTA-TSPEC element and then copies 120 the other parameters of the RTA-TSPEC element from the ADDRTATS request frame before ending 122.

However, if at block 114 it is found that the STA rejected the RTA-TS setup, but suggested a change of the parameters in RTA-TSPEC element, then this STA sets the parameters of the RTA-TSPEC element to suggest 116 another round of RTA-TS setup before execution ends 122.

Figure 11:
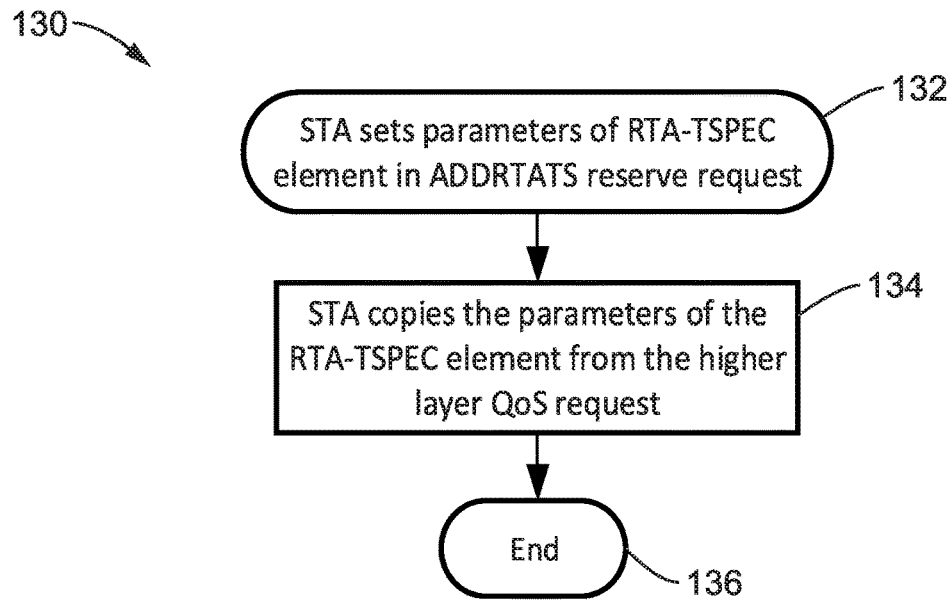
FIG. 11 is a flow diagram of a STA setting parameters in RTA-TSPEC within an ADDTS reserve request frame according to at least one embodiment of the present disclosure.

FIG. 11 illustrates an example embodiment 130 of a STA setting the parameters of RTA-TSPEC element for ADDR-TATS reserve request frame. The process commences 132 for a STA to set the parameters in the RTA-TSPEC element in ADDRTATS reserve request frame, and it copies 134 the parameters of the RTA-TSPEC element from the higher layer QoS request before ending 136.

4.3.2. RTA-TS Setup

Figure 12:
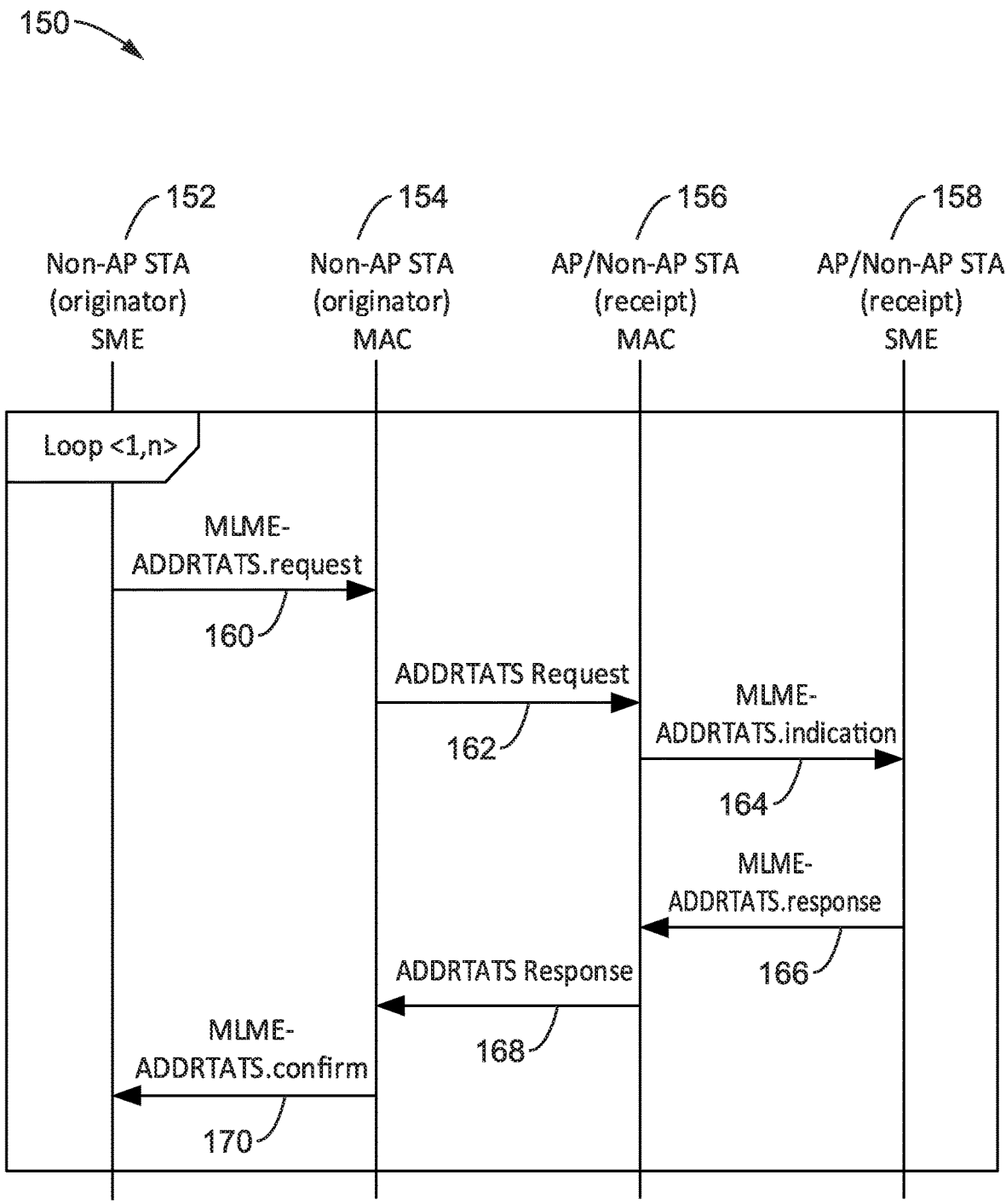
FIG. 12 is a communication sequence diagram of a non-AP STA initiated RTA-TS setup for RTA traffic according to at least one embodiment of the present disclosure.

FIG. 12 illustrates an example embodiment 150 of one iteration of message exchange between two STAs when the originator non-AP STA initiates an RTA-TS setup procedure with a recipient STA. The figure depicts actions of the originating station at the Station Management Entity (SME) 152 and MAC layer 154, as well as the receiving station, which is either an AP STA or non-AP STA, with interaction also shown at MAC layer 156 and SME 158.

Figure 15:
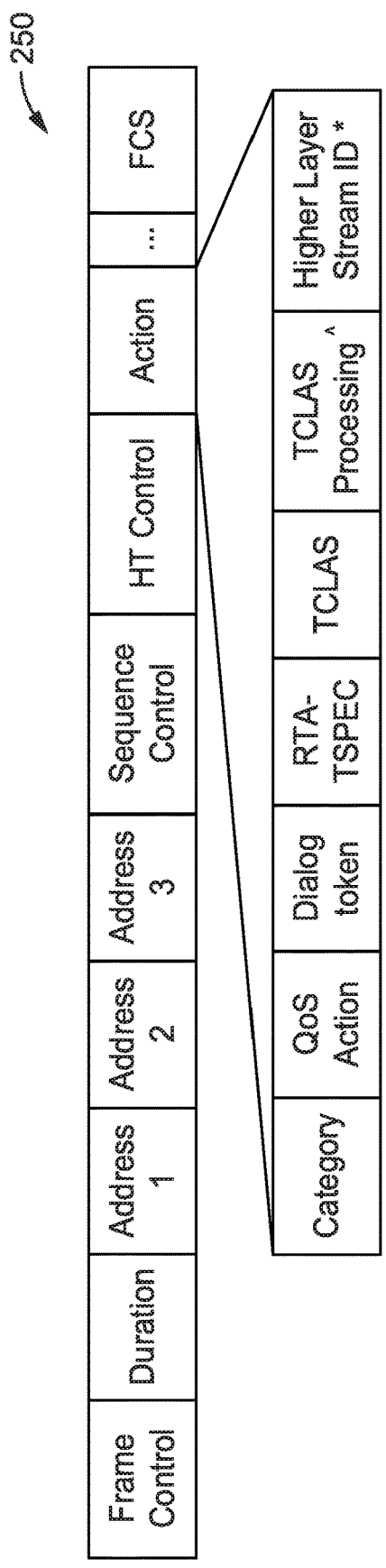
FIG. 15 is a data field diagram of an ADDRTATS request frame format according to at least one embodiment of the present disclosure.

The originator STA, in this case a non-AP STA, decides to initiate an RTA-TS setup procedure with the recipient STA, such as an AP or non-AP STA. The SME of the originator STA sends a MLME-ADDRTATS.request message 160 to its MAC. The format of the MLME-ADDR-TATS.request message is outlined in Table 1. When the MAC of the originator STA receives the MLME-ADDR-TATS.request message, it collects the information in the MLME-ADDRTATS.request message and sends an ADDR-TATS request frame 162 to the recipient STA. The format of the ADDRTATS request frame is shown in FIG. 15. The parameter setting of the fields in the RTA-TSPEC element of the ADDRTATS request frame was explained in regard to FIG. 9 above.

Figure 16:
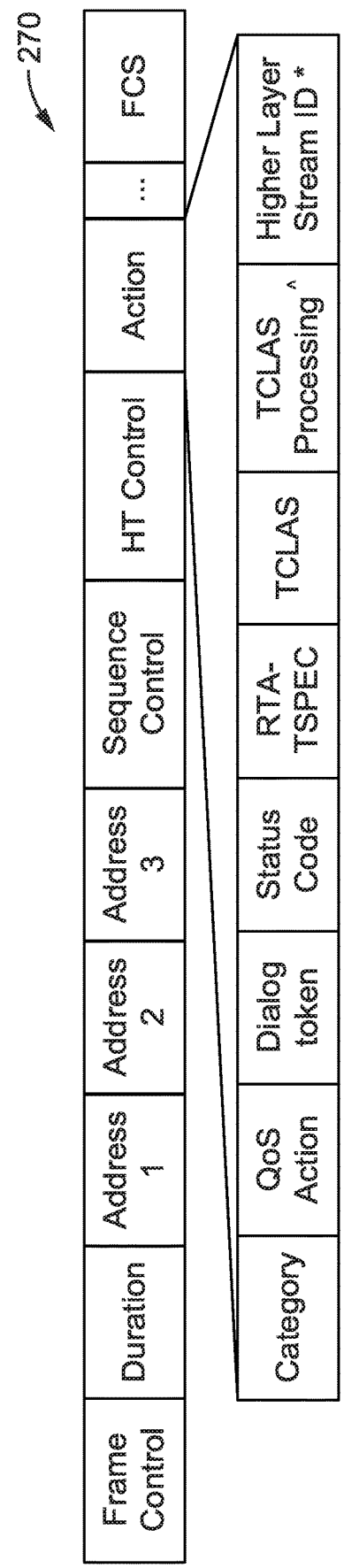
FIG. 16 is a data field diagram of an ADDRTATS response frame format according to at least one embodiment of the present disclosure.

The MAC of the recipient STA receives the frame 162 and generates a MLME-ADDRTATS.indication message 164, as outlined in Table 2, to its SME. Then the SME of the recipient STA sends an MLME-ADDRTATS.response 166 message containing an RTA-TS setup result to its MAC. The format of MLME-ADDRTATS.response message is outlined in Table 3. Then, the MAC of the recipient STA sends an ADDRTATS response frame 168 as shown in FIG. 16 to the originator STA MAC. The parameter setting of the fields in the RTA-TSPEC element of the ADDRTATS response frame was previously explained in FIG. 10. The MAC of the originator STA receives the frame and sends an MLME-ADDRTATS.confirm message 170, as outlined in Table 4, to its SME. From this information the originator can determine whether TS setup was successful or not.

If the TS setup fails, the originator STA can receive the suggested parameters of the RTA-TSPEC element from the ADDRTATS response frame. The originator STA can repeat the procedure (loop of message iterations) to renegotiate the RTA-TS setup. The parameter setting of the RTA-TSPEC element in the ADDRTATS response frame was also explained in FIG. 10. This loop can occur multiple times. If the TS setup fails with no suggested parameters of the RTA-TSPEC element from the ADDRTATS response frame, then the TS setup fails with no more negotiation.

Figure 13:
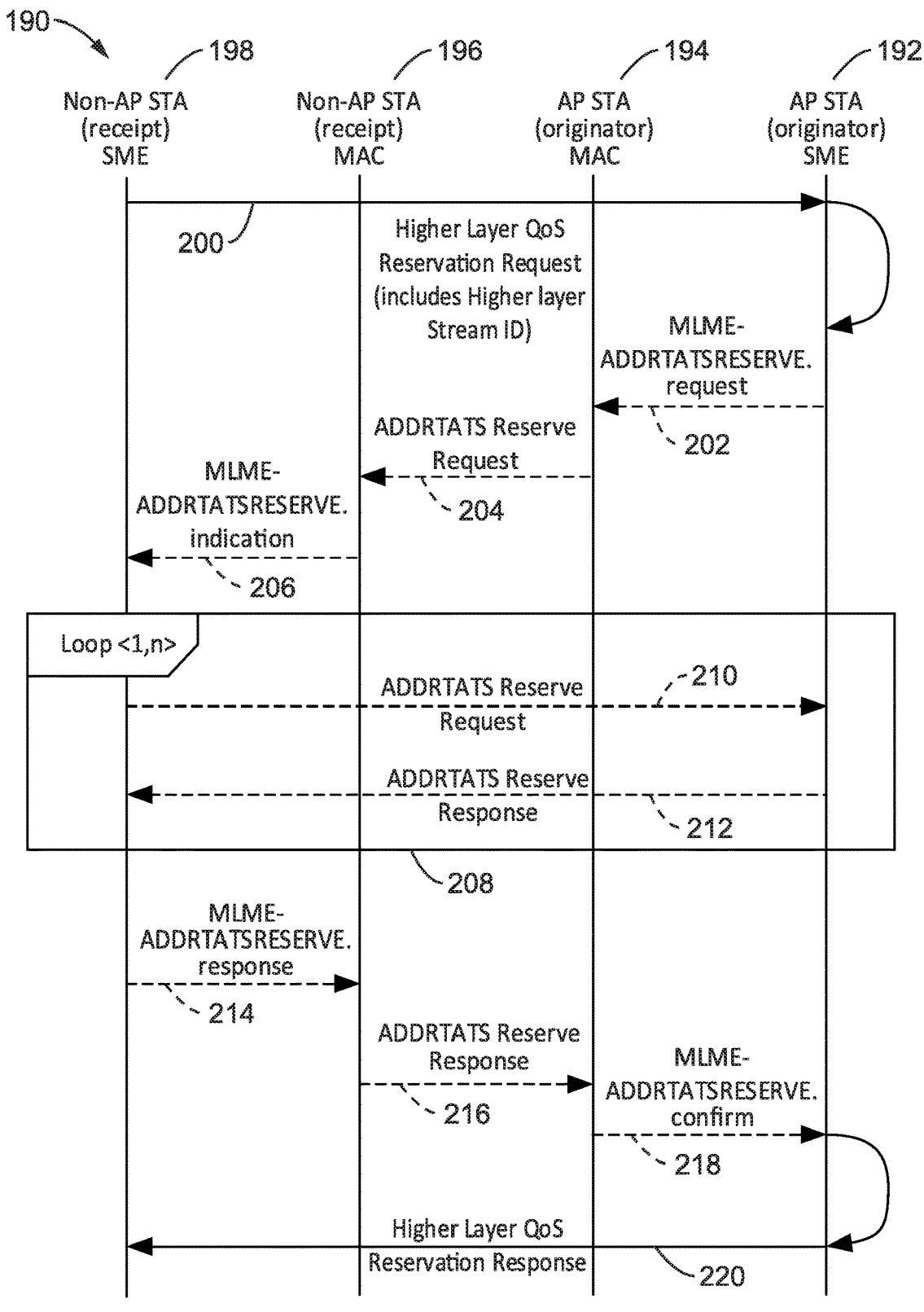
FIG. 13 is a communication sequence diagram of an AP STA initiated TS setup for RTA traffic according to at least one embodiment of the present disclosure.

FIG. 13 illustrates an example embodiment 190 of a message exchange between two STAs when an RTA-TS setup procedure for RTA is initialized by an AP. Again the figure depicts the SME and MAC of both the originator and receiver, however, in this case the originator is an AP station with its SME 192 and MAC 194, and the receiver non-AP station is also shown with activity of its MAC 196 and SME 198. Before the originator STA, in this example an AP, starts the procedure of an RTA-TS setup, the receipt STA, in this example a non-AP STA, sends a QoS reservation request 200 to the originator STA over the higher layer.

Figure 17:
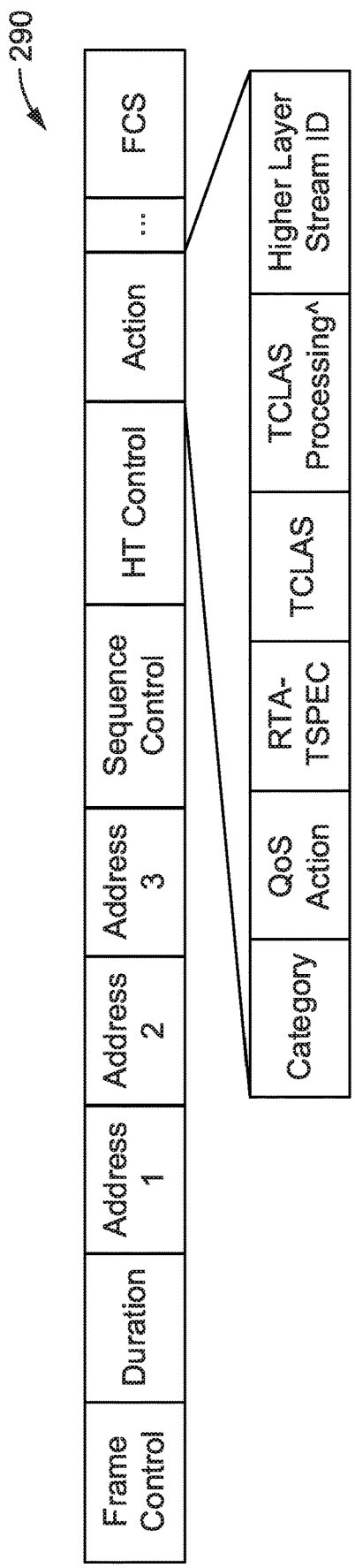
FIG. 17 is a data field diagram of an ADDRTATS reserve request frame format according to at least one embodiment of the present disclosure.

The originator STA then starts an RTA-TS setup procedure with the recipient STA. The SME of the originator STA sends a MLME-ADDRTATSRESERVE.request 202 message to its MAC. The format of the MLME-ADDRTATS-RESERVE.request message is depicted in Table 5. When the MAC of the originator STA receives the MLME-ADDR-TATSRESERVE.request message, it collects the information in the MLME-ADDRTATSRESERVE.request message and sends an ADDRTATS Reserve request frame 204 to the recipient STA. The format of the ADDRTATS reserve request frame is shown in FIG. 17 and the parameter setting of the RTA-TSPEC element in the ADDRTATS Reserve request frame is explained in FIG. 11. The MAC of the recipient STA receives the frame and generates a MLME-ADDRTATSRESERVE.indication message 206 as shown in Table 6 to its SME.

Then, in at least one action 208 of a possible loop from 1 to n iterations, the recipient STA sends an ADDRTATS request frame 210 to the originator STA from which it receives an ADDRTATS response frame 212. The procedure of exchanging the ADDRTATS request frame and the ADDRTATS response frame is the same as described in FIG. 12.

Figure 18:
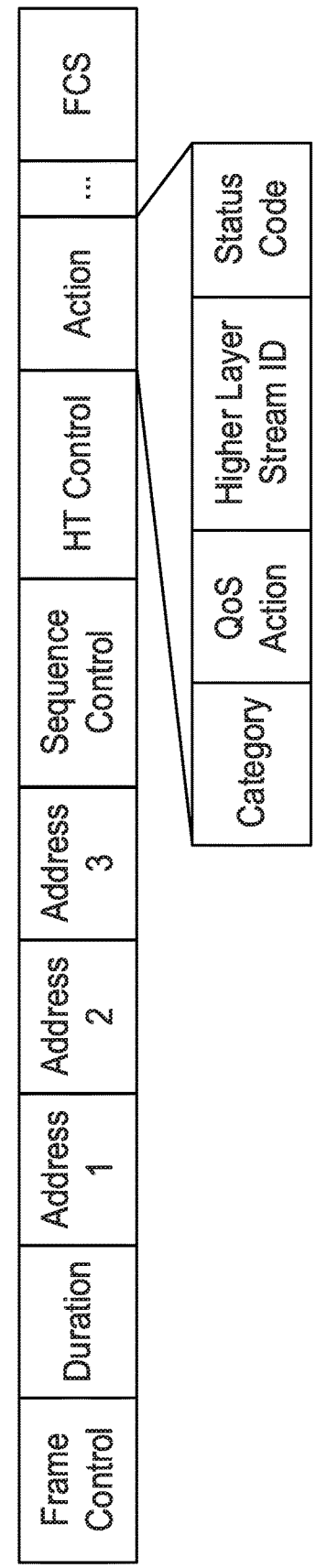
FIG. 18 is a data field diagram of an ADDRTATS reserve response frame format according to at least one embodiment of the present disclosure.

Next, the SME of the recipient STA sends an MLME-ADDRTATSRESERVE. response message 214 containing RTA-TS setup result to its MAC. The format of MLME-ADDRTATSRESERVE.response message is shown in Table 7. Then, the MAC of the recipient STA sends an ADDR-TATS Reserve response frame 216, whose format can be the same as shown in FIG. 18, to the originator STA. The MAC of the originator STA receives the frame and sends an MLME-ADDRTATSRESERVE.confirm message 218, whose format is shown in Table 8, to its SME. Finally, the originator STA sends a QoS reservation response 220 to the receipt STA over the higher layer.

Figure 14:
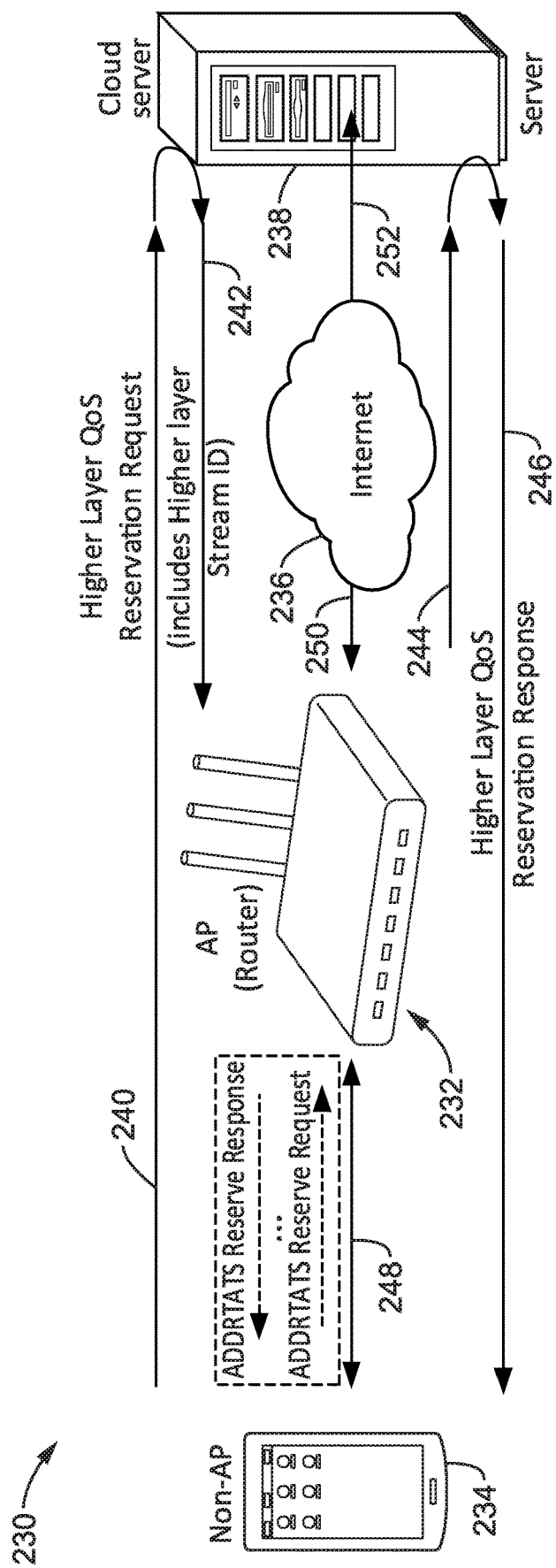
FIG. 14 is a block diagram of a use case depicting an AP initiated TS setup according to at least one embodiment of the present disclosure.

FIG. 14 illustrates an example embodiment 230 showing how the RTA-TS setup procedure can be utilized. It should be appreciated that this example is provided by way of example and not limitation; wherein the setup procedure can be utilized according to the present disclosure in a wide range of ways and for differing configurations and objectives. The AP 232, depicted as a router by way of example and not limitation, is connected to a cloud server 238 over the internet 236 for communicating in both directions 250, 252. Reference numbers 250, 252 show the general flow of all these communications through the internet, and do not represent any specific communication. The non-AP 234 connects through the cloud server 238 to ask the AP to initiate an RTA-TS setup procedure. Since the AP, such as router, does not have real time applications, the cloud server collects essential information (i.e., higher layer QoS reserve request 240 including higher layer stream ID) for RTA-TS setup from the non-AP STA 234 through higher layer and passes information 242 through internet 236 to AP 238. Then, the non-AP 234 and AP 232 start the steps of an AP-initiated RTA-TS setup procedure by exchanging 248 the ADDRTATS reserve request frame and exchanging the ADDRTATS reserve response frame. Finally, the AP 232 passes a QoS reservation response 244 through internet 236 to the cloud server 238 and the cloud server passes it back 246 through internet 236 for receipt by STA 234 over the higher layer.

4.3.3. MLME SAP Interface

The tables at the end of this specification provide a summary of the following functions.

Table 1: Description of MLME-ADDRTATS.request function.

Table 2: Description of MLME-ADDRTATS.indication function.

Table 3: Description of MLME-ADDRTATS.response function.

Table 4: Description of MLME-ADDRTATS.confirm function.

Table 5: Description of MLME-ADDTSRESERVE.request function.

Table 6: Description of MLME-ADDTSRESERVE.indication function.

Table 7: Description of MLME-ADDTSRESERVE.response function.

Table 8: Description of MLME-ADDTSRESERVE.confirm function.

4.3.4. Frame Format

FIG. 15 illustrates an example embodiment 250 of the ADDRTATS Request frame, comprising the following fields. (a) A Frame Control field indicates the type of frame. (b) A Duration field contains NAV information used for CSMA/CA channel access. (c) An Address 1 field contains the address of the recipient of the frame. (d) An Address 2 field contains the address of the STA that transmitted the frame. (e) An Address 3 field contains the BSSID. (f) A Sequence control field indicates the sequence number of the frame. (g) An HT control field indicates the extra control information for HT or VHT frames. (h) An Action field indicates the action to perform when it is the ADDRTATS Request frame.

In the lower portion of this figure is seen the subfields within the Action field. (j) A Category subfield and QoS Action subfield indicate the type of action field and QoS action. The action field is exemplified as an ADDRTATS Request frame. (k) A Dialog token subfield specifies the ADDRTATS transaction. (l) An RTA-TSPEC subfield indicates the parameters in the RTA-TSPEC element (as was shown in FIG. 7) except for the fields between the minimum service interval field and medium time field. The transmitter of this frame sets this element to indicate the QoS requirement of RTS-TS so that the receiver of this frame can estimate whether it is able to satisfy the QoS requirement of RTA-TS and decide whether this RTA-TS could be accepted. (m) A TCLAS field indicates the parameters in the TCLAS element, which are set by the MLME-ADDTS.request function. The transmitter of this frame sets the TCLAS element in the frame so that the receiver of this frame can be used to classify the RTA-TS from the upper layer. It should be noted that multiple TCLAS fields may exist in one frame.

(n) A TCLAS Processing field indicates the parameters in the TCLAS Processing element, which are set by the MLME-ADDTS.request function. The transmitter of this frame sets the TCLAS Processing element in the frame so that the receiver of this frame can classify the RTA-TS from the upper layer when multiple TCLAS fields exist. It should be noted that this field only exists when there are multiple TCLAS fields in the frame. (o) A HigherLayerStreamID field indicates the Higher Layer Stream ID from a higher layer stream reservation request. The transmitter of this frame sets this field in the frame so that the receiver of this frame can map the current RTA-TS to the higher layer stream reservation procedure. It should be noted that this field is only available in AP-initiated RTA-TS setup.

FIG. 16 illustrates an example embodiment 270 of the fields within the ADDRTATS Response frame. (a) A Frame Control field indicates the type of frame. (b) A Duration field contains NAV information used for CSMA/CA channel access. (c) An Address 1 field contains an address for the recipient of the frame. (d) An Address 2 field contains an address of the STA that transmitted the frame. (e) An Address 3 field contains the BSSID. (f) A Sequence control field indicates the sequence number of the frame. (g) An HT control field indicates the extra control information for HT or VHT frames. (h) An Action field indicates the action to perform when it is the ADDRTATS Response frame.

Subfields within the Action field are seen in the lower portion of FIG. 16 as follows. (i) A Category subfield and QoS Action subfield indicate the type of action and QoS action; in this case the action field for the ADDRTATS Response frame. (j) A Dialog token subfield specifies the ADDRTATS transaction. (k) A Status Code subfield indicates the result of the corresponding RTA-TS setup procedure. If the status code is accepted, then the RTA-TS is setup successfully. The receiver of this frame is configured to start the service of RTA-TS. If the status code is rejected, then the RTA-TS setup fails, and the receiver of this frame is not able to renegotiate the RTA-TS setup. If the status code is rejected with suggested changes, then the receiver of this frame is able to renegotiate the RTA-TS setup with suggested changes. (l) An RTA-TSPEC subfield indicates the parameters in the RTA-TSPEC element (as was shown in FIG. 7), with the parameter setting of this field being explained in a previous section. If the status code is accepted, then the transmitter of this frame sets this field to indicate how to serve the RTA-TS so that the receiver of this frame can follow to satisfy the QoS requirement of RTA-TS. If the status code is rejected with suggested changes, the transmitter of this frame sets the suggested parameters in this field so that the receiver of this frame can use these parameters to renegotiate the RTA-TS setup. (m) A TCLAS subfield indicates the parameters in the TCLAS element. The transmitter of this frame sets this field so that the receiver of this frame can use this field to classify the RTA-TS from the upper layer. It should be noted that the frame can have multiple TCLAS fields. (n) A TCLAS Processing subfield indicates the parameters in the TCLAS Processing element. The transmitter of this frame sets this field so that the receiver of this frame can use this field to classify the RTA-TS from the upper layer when the frame has multiple TCLAS fields. (o) A HigherLayerStreamID subfield indicates the Higher Layer Stream ID from higher layer stream reservation request. The transmitter of this frame sets this field in the frame so that the receiver of this frame can map the current RTA-TS to the higher layer stream reservation procedure. It should be appreciated that this field is only available in AP-initiated RTA-TS setup.

FIG. 17 illustrates an example embodiment 290 of the fields of a ADDRTATS Request frame. (a) A Frame Control field indicates the type of the frame. (b) A Duration field contains NAV information used for CSMA/CA channel access. (c) An Address 1 field contains the address of the recipient of the frame. (d) An Address 2 field contains the address of the STA that transmits the frame. (e) An Address 3 field contains the BSSID. (f) A Sequence control field indicates the sequence number of the frame. (g) An HT control field indicates the extra control information for HT or VHT frames. (h) An Action field indicates the action to perform when this is an ADDRTATS Reserve Request frame.

The subfields in the Action field are described as follows. (i) A Category subfield and QoS Action subfield indicate the type of action field; in this example being Reserve Request frame. (j) An RTA-TSPEC subfield indicates the parameters in the RTA-TSPEC element. The parameter setting in this subfield is explained in a previous section. The transmitter of this frame sets this subfield to indicate the QoS requirement of the RTA-TS so that the receiver of this frame can use this information to negotiate the RTA-TS setup. (k) A TCLAS subfield indicates the parameters in the TCLAS element. The transmitter of this frame sets this field so that the receiver of this frame can use this field to classify the RTA-TS from the upper layer. It should be noted that the frame can have multiple TCLAS fields. (l) A TCLAS Processing subfield indicates the parameters in the TCLAS Processing element. The transmitter of this frame sets this field so that the receiver of this frame can use this field to classify the RTA-TS from the upper layer when the frame has multiple TCLAS fields. (m) A HigherLayerStreamID subfield indicates the Higher Layer Stream ID from higher layer stream reservation request. The transmitter of this frame sets this field in the frame so that the receiver of this frame can map the current RTA-TS to the higher layer stream reservation procedure.

FIG. 18 illustrates an example embodiment 310 of the field format within an ADDRTATS Response frame. (a) A Frame Control field indicates the type of frame. (b) A Duration field contains NAV information used for CSMA/CA channel access. (c) An Address 1 field contains an address for the recipient of the frame. (d) An Address 2 field contains the address of the STA that transmitted the frame. (e) An Address 3 field contains the BSSID. (f) A Sequence control field indicates the sequence number of the frame. (g) An HT control field indicates the extra control information for HT or VHT frames. (h) An Action field indicates the action to perform when it is the ADDRTATS Reserve Response frame.

The action field in the figure has a number of subfields as follows. (i) A Category subfield and QoS Action subfield indicate the type of action field; in this instance the action field is for the ADDRTATS Reserve Response frame. (l) A HigherLayerStreamID subfield indicates the Higher Layer Stream ID from a higher layer stream reservation request. The transmitter of this frame sets this field in the frame so that the receiver of this frame can map the current RTA-TS to the higher layer stream reservation procedure. (m) Status Code field indicates the result of the corresponding RTA-TS setup procedure. If the status code is accepted, then the RTA-TS is setup successfully. If the status code is rejected, then the RTA-TS setup fails, and the receiver of this frame is not able to renegotiate the RTA-TS setup.

4.3.5. Examples

Table 9 lists an example of RTA-TS that is setup at STA0 in the network topology as shown in FIG. 6. The row represents an RTA-TS setup with STA1 for an RTA session. This RTA-TS is denoted by RTA-TS 1 since the RTA-TS ID is equal to 1. For this RTA-TS, STA0 needs to transmit RTA packets to STA1. The priority represents the RTA priority which is set to 4. Since the traffic is periodic (set to "1") and the lifetime is 11 ms, STA1 can determine that packet loss has occurred if it does not receive any packets of RTA-TS 1 for a given time, exemplified herein as 23 ms (MSDU lifetime+maximum service interval). Since the Deterministic Service is set to "1", the MSDU or A-MSDU of this RTA-TS will be dropped when the lifetime expires. The reliability represents that the packet loss of TS 1 should be less than 0.01%. The jitter represents TS 1 requests in which the standard deviation of the latency should be less than 5 ms. The difference between the maximum service interval and the minimum service interval is 4 ms, which is less than the jitter. The medium time is 2 ms, which guarantees the time for all the MSDUs and A-MSDUs of this RTA-TS generated during the nominal service interval being transmitted at minimum PHY rate 54 Mb/s.

5. General Scope of Embodiments

The enhancements described in the presented technology can be readily implemented within various wireless network nodes (wireless communication devices) and their associated communications protocols. It should also be appreciated that each of these network node devices are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely, such as on a server, or alternatively a combination of being stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets over a network supporting traffic stream (TS) operations in which real time application (RTA) traffic and non-RTA traffic coexist; (d)(ii) distinguishing real-time application (RTA) packets from non-real-time application (non-RTA) packets; (d)(iii) generating a request from an initiator station to another station in the local area network (WLAN) requesting establishment of a traffic stream (TS) for an RTA session; (d)(iv) receiving the request for establishing a traffic stream from the initiator station, at a station operating as a responder station; (d)(v) checking, by said responder station, whether it can satisfy the traffic stream requirement of the RTA session; and (d)(vi) responding, by said responder station, to the initiator station indicating whether it will accept or deny the traffic stream (TS) for the RTA session.

2. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets over a network supporting traffic stream (TS) operations in which real time application (RTA) traffic and non-RTA traffic coexist; (d)(ii) distinguishing real-time application (RTA) packets from non-real-time application (non-RTA) packets; (d)(iii) generating a request from an initiator station to another station in the local area network (WLAN) requesting establishment of a traffic stream (TS) for an RTA session, wherein said traffic stream (TS) represents a set of Medium Access Communication Service Data Units (MSDUs) under the same traffic specification and QoS requirement; (d)(iv) receiving the request for establishing a traffic stream from the initiator station, at a station operating as a responder station; (d)(v) checking, by said responder station, whether it can satisfy the traffic stream requirement of the RTA session; (d)(vi) responding, by said responder station, to the initiator station indicating whether it will accept or deny the traffic stream (TS) for the RTA session; and (d)(vii) establishing said traffic stream (TS) in a medium access control (MAC) protocol which provides Carrier Sense Multiple Access/Collision Avoidance (CSMA/CA).

3. A wireless communication system/apparatus performing transmission of packets, wherein a traffic stream (TS) operation is applied, in which the real time application (RTA) traffic and non-RTA traffic coexist in the system/apparatus, comprising: (a) STA1 requests STA2 to establish a TS of an RTA session; (b) STA2 receives the request and checks whether it could satisfy the requirement of the RTA session; and (c) STA2 responds STA1 whether it accepts or denies the TS of the RTA session.

4. A method of performing wireless communication between wireless communications circuits over a network, comprising: (a) operating a wireless communication circuit as a WLAN station configured to support communicating real-time application (RTA) packets that are sensitive to communication delays as well as non-real time packets over a network supporting within traffic stream (TS) operations in which real time application (RTA) traffic and non-RTA traffic coexist; (b) distinguishing real-time application (RTA) packets from non-real-time application (non-RTA) packets; (c) generating a request from an initiator station to another station in the local area network (WLAN) requesting establishment of a traffic stream (TS) for an RTA session; (d) receiving the request for establishing a traffic stream from the initiator station, at a station operating as a responder station; (e) checking, by said responder station, whether it can satisfy the traffic stream requirement of the RTA session; and (f) responding, by said responder station, to the initiator station indicating whether it will accept or deny the traffic stream (TS) for the RTA session.

5. The apparatus, system or method of any preceding embodiment, wherein said traffic stream (TS) represents a set of Medium Access Communication Service Data Units (MSDUs) under the same traffic specification and QoS requirement.

6. The apparatus, system or method of any preceding embodiment, wherein traffic stream (TS) is performed in a medium access control (MAC) protocol providing Carrier Sense Multiple Access/Collision Avoidance (CSMA/CA).

7. The apparatus, system or method of any preceding embodiment, wherein when said request from an initiator station to another station in the local area network (WLAN) for establishment of a traffic stream (TS) for an RTA session is generated, the request indicates that the traffic stream (TS) requires deterministic service.

8. The apparatus, system or method of any preceding embodiment, wherein when said request from an initiator station to another station in the local area network (WLAN) for establishment of a traffic stream (TS) for an RTA session is generated, the request indicates RTA session requirements selected from the group consisting of latency, jitter and packet loss.

9. The apparatus, system or method of any preceding embodiment, wherein when said request from an initiator station to another station in the local area network (WLAN) for establishment of a traffic stream (TS) for an RTA session is generated, the request indicates packet lifetime of the traffic stream in the traffic stream request.

10. The apparatus, system or method of any preceding embodiment, wherein when said request from an initiator station to another station in the local area network (WLAN) for establishment of a traffic stream (TS) for an RTA session is generated, the request indicates an RTA priority in the traffic stream request.

11. The apparatus, system or method of any preceding embodiment, wherein when said request from an initiator station to another station in the local area network (WLAN) for establishment of a traffic stream (TS) for an RTA session is generated, the request includes a request for the responder station to indicate a reason for denying the traffic stream (TS) request.

12. The apparatus, system or method of any preceding embodiment, wherein when said request from an initiator station to another station in the local area network (WLAN) for establishment of a traffic stream (TS) for an RTA session is generated, the request indicates that the traffic stream (TS) requires deterministic service.

13. The apparatus, system or method of any preceding embodiment, wherein when said request from an initiator station to another station in the local area network (WLAN) for establishment of a traffic stream (TS) for an RTA session is generated, the request indicates RTA session requirements selected from the group consisting of latency, jitter and packet loss.

14. The apparatus, system or method of any preceding embodiment, wherein when said request from an initiator station to another station in the local area network (WLAN) for establishment of a traffic stream (TS) for an RTA session is generated, the request indicates packet lifetime of the traffic stream in the traffic stream request.

15. The apparatus, system or method of any preceding embodiment, wherein when said request from an initiator station to another station in the local area network (WLAN) for establishment of a traffic stream (TS) for an RTA session is generated, the request indicates an RTA priority in the traffic stream request.

16. The apparatus, system or method of any preceding embodiment, wherein when said request from an initiator station to another station in the local area network (WLAN) for establishment of a traffic stream (TS) for an RTA session is generated, the request includes a request for the responder station to indicate a reason for denying the traffic stream (TS) request.

17. The apparatus, system or method of any preceding embodiment, where STA1 requesting STA2 to establish a TS of an RTA session could indicate the TS needs deterministic service in the request.

18. The apparatus, system or method of any preceding embodiment, wherein STA1 requesting STA2 to establish a TS of an RTA session could indicate the requirements of RTA session, such as latency, jitter and packet loss, in the request.

19. The apparatus, system or method of any preceding embodiment, wherein STA1 requesting STA2 to establish a TS of an RTA session could indicate the packet lifetime of the TS in the request.

20. The apparatus, system or method of any preceding embodiment, wherein STA1 requesting STA2 to establish a TS of an RTA session could indicate the RTA priority.

21. The apparatus, system or method of any preceding embodiment, wherein STA2 rejecting STA1 to establish a TS of an RTA session could tell STA1 the reason of rejection.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Description of MLME-ADDRTATS.request function

| | | |
|---|---|---|
| Function | MLME-ADDRTATS.request (DialogToken, RTA-TSPEC, TCLAS, TCLASProcessing, HigherLayerStreamID, STAAddress) | |
| When generated | The SME of STA generates this message and passes it to its MLME when the non-AP STA decides to initiate an RTA-TS setup procedure. | |
| Effect of receipt | When the MLME of STA receives this message, it transmits an ADDRTATS request frame to the recipient STA. | |

| Parameters | Name | Type | Description |
|---|---|---|---|
| | DialogToken | Integer | Specifies the ADDRTATS transaction |
| | RTA-TSPEC | RTA-TSPEC element as shown in FIG. 7 | SME specifies the parameters in the RTA-TSPEC element except for the fields between minimum service interval field and the medium time field according to the QoS requirement of the RTA-TS. MLME will copy this element in ADDRTATS request frame to launch an RTA-TS setup procedure. |
| | TCLAS | TCLAS element as shown in FIG. 3 | SME specifies the parameters in the TCLAS element which is used to classify the traffic from the upper layers. MLME will copy this element in ADDRTATS request frame. SME could have multiple TCLAS elements in this message. |
| | TCLASProcessing | TCLAS Processing element shown in FIG. 4 | SME specifies the parameters in the TCLAS Processing element to tell how to identify the traffic from the upper layer if the multiple TCLAS elements exist. MLME will copy this element in ADDRTATS request frame. |
| | HigherLayerStreamID | Higher Layer stream ID from higher layer QoS reservation request | SME may specify the parameters in the Higher Layer Stream ID element if this information is given by the upper layer. This field could be used to map the current RTA-TS setup procedure to the higher layer QoS reservation process. MLME will copy this element in ADDRTATS request frame. |
| | STAAddress | MAC address | SME specifies the MAC address of the receipt of the ADDRTATS request frame. |

TABLE 2

Description of MLME-ADDRTATS.indication Function

| | | |
|---|---|---|
| Function | MLME-ADDRTATS.indication (DialogToken, STAAddress, RTA-TSPEC, TCLAS, TCLASProcessing, HigherLayerStreamID) | |
| When generated | The MLME of STA generates this message and passes it to its SME when the MLME of STA receives an ADDRTATS request frame | |
| Effect of receipt | When the SME of STA receives this message, it needs to decide whether it is able to satisfy the RTA-TS QoS requirement and accepts the RTA-TS setup. | |

| Parameters | Name | Type | Description |
|---|---|---|---|
| | DialogToken | Integer | Specifies the ADDRTATS transaction |
| | STAAddress | MAC address | MLME indicates the MAC address of the STA which transmits ADDRTATS request frame. The SME receiving this information should send an ADDRTATS response frame back to that STA. |

TABLE 2-continued

Description of MLME-ADDRTATS.indication Function

| | | |
|---|---|---|
| RTA-TSPEC | RTA-TSPEC element as shown in FIG. 7 | MLME passes the parameters in the RTA-TSPEC element received in the ADDRTATS request frame to SME. The SME shall use the use those parameters to estimate whether the RTA-TS setup can be accepted or not. |
| TCLAS | TCLAS element as shown in FIG. 3 | MLME passes the parameters in the TCLAS element received in the ADDRTATS request frame to SME. The SME shall use the use those parameters to classify the traffic belong to the RTA-TS from the upper layer. |
| TCLASProcessing | TCLAS Processing element as shown in FIG. 4 | MLME passes the parameters in the TCLAS Processing element in the ADDRTATS request frame to SME. The SME shall use the use those parameters to classify the traffic belong to the RTA-TS from the upper layer when multiple TCLAS exists. |
| HigherLayerStreamID | Higher Layer stream ID from higher layer QoS reservation request | MLME may pass this field to SME if it is given by the upper layer. This field could be used to map the current RTA-TS setup procedure to the higher layer QoS reservation process. |

TABLE 3

Description of MLME-ADDRTATS.response Function

| | |
|---|---|
| Function | MLME-ADDRTATS.response (STAAddress, ResultCode, DialogToken, RTA-TSPEC, TCLAS, TCLASProcessing, HigherLayerStreamID) |
| When generated | The SME of STA generates this message and transmits it to its MLME when the STA makes decision of RTA-TS setup requested from the originator. |
| Effect of receipt | When the MLME of STA receives this message, it transmits an ADDRTATS response frame to the originator STA. |

| Parameters | Name | Type | Description |
|---|---|---|---|
| | STAAddress | MAC address | SME indicates the MAC address of the STA to send an ADDRTATS response frame. |
| | ResultCode | Enumerator | SME indicates the result of the corresponding RTA-TS setup procedure. The result code could be ACCEPT, REJECT, REJECT_WITH_SUGGESTED_CHANGES, and so on. MLME receives this information and copies it in the ADDRTATS response frame. |
| | DialogToken | Integer | Specifies the ADDRTATS transaction |
| | RTA-TSPEC | RTA-TSPEC element as shown in FIG. 7 | SME indicates the parameters in the RTA-TSPEC element that will be carried by the ADDRTATS response frame. |
| | TCLAS | TCLAS element as shown in FIG. 3 | SME indicates the parameters in the TCLAS element that will be carried by the ADDRTATS response frame. |
| | TCLASProcessing | TCLAS Processing element as shown in FIG. 4 | SME indicates the parameters in the TCLAS Processing element that will be carried by the ADDRTATS response frame |
| | HigherLayerStreamID | Higher Layer stream ID from higher layer QoS reservation request | SME may specify the parameters in the Higher Layer Stream ID element if this information is given by the upper layer. This field could be used to map the current RTA-TS setup procedure to the higher layer QoS reservation process. MLME will copy this element in ADDRTATS request frame. |

TABLE 4

Description of MLME-ADDRTATS.confirm Function

| | | | |
|---|---|---|---|
| Function | MLME-ADDRTATS.confirm (ResultCode, DialogToken, RTA-TSPEC, TCLAS, TCLASProcessing, HigherLayerStreamID, STAAddress) | | |
| When generated | The MLME of STA generates this message and passes it to its SME when the MLME of STA receives an ADDRTATS response frame | | |
| Effect of receipt | When the SME of STA receives this message, it knows the RTATS setup result from the recipient STA. | | |

| Parameters | Name | Type | Description |
|---|---|---|---|
| | ResultCode | Enumerator | MLME passes RTA-TS setup result received in ADDRTATS response frame to SME, which can either start the MSDU or A-MPDU belonging to the RTA-TS if the result is ACCEPT or renegotiate the RTA-TS setup with AP if results is REJECT_WITH_SUGGESTED_CHANGES. |
| | DialogToken | Integer | Specifies the ADDRTATS transaction |
| | RTA-TSPEC | RTA-TSPEC element as shown in FIG. 7 | MLME passes the parameters in the RTA-TSPEC element received in ADDRTATS response frame to SME. SME may start transmissions of MSDU or A-MSDU belong to the RTA-TS if the RTA-TS setup is accepted. SME may use the suggested parameters in the RTA-TSPEC element to renegotiate RTA-TS setup with AP if the ResultCode is REJECT_WITH_SUGGESTED_CHANGES. |
| | TCLAS | TCLAS element as shown in FIG. 3 | MLME passes parameters in the TCLAS element received in ADDRTATS response frame to SME. SME may use information to classify RTA-TS from upper layer. Multiple TCLAS elements can exist here. |
| | TCLASProcessing | TCLAS Processing element as shown in FIG. 4 | MLME passes the parameters in the TCLAS Processing element received in ADDRTATS response frame to SME. SME may use this information to classify the RTA-TS from the upper layer when multiple TCALS elements exist. |
| | HigherLayerStreamID | Higher Layer stream ID from higher layer QoS reservation request | MLME passes the parameters in the Higher Layer Stream ID element received in ADDRTATS response frame to SME. This field could be used to map the current RTA-TS setup procedure to the higher layer QoS reservation process. |
| | STAAddress | MAC address | MLME indicates the MAC address of the STA which transmits the ADDRTATS response frame. |

TABLE 5

Description of MLME-ADDTSRESERVE.request Function

| | | | |
|---|---|---|---|
| Function | MLME-ADDRTATSRESERVE.request (STAAddress, DialogToken, RTA-TSPEC, TCLASS, TCLASProcessing, HigherLayerStreamID) | | |
| When generated | The SME of STA generates this message and passes it to its MLME when the AP STA decides to initiate an RTA-TS setup procedure. | | |
| Effect of receipt | When the MLME of STA receives this message, it transmits an ADDRTATS reserve request frame to the recipient STA. | | |

| Parameters | Name | Type | Description |
|---|---|---|---|
| | STAAddress | MAC address | SME indicates the MAC address of the STA to transmit the ADDRTATS reserve request frame. |
| | DialogToken | Integer | Specifies the ADDRTATS reserve transaction |
| | RTA-TSPEC | RTA-TSPEC element as shown in FIG. 7 | SME specifies the parameters in the RTA-TSPEC element except for the fields between minimum service interval field and the medium time field according to the QoS requirement of the RTA-TS. MLME will copy this element in ADDRTATS reserve request frame to launch an RTA-TS setup procedure. |
| | TCLASS | TCLAS element as shown in FIG. 3 | SME specifies the parameters in the TCLAS element which is used to classify the traffic from the upper layers. MLME will copy this element in ADDRTATS reserve request frame. SME could have multiple TCLAS elements in this message. |

TABLE 5-continued

Description of MLME-ADDTSRESERVE.request Function

| | | |
|---|---|---|
| TCLASProcessing | TCLAS Processing element as shown in FIG. 4 | SME specifies the parameters in the TCLAS Processing element to tell how to identify the traffic from the upper layer if the multiple TCLAS elements exist. MLME will copy this element in ADDRTATS reserve request frame. |
| HigherLayerStreamID | Higher Layer stream ID from higher layer QoS reservation request | SME specifies the parameters in the Higher Layer Stream ID element from the upper layer reservation request. This field could be used to map the current RTA-TS setup procedure to the higher layer QoS reservation process. MLME will copy this element in ADDRTATS reserve request frame. |

TABLE 6

Description of MLME-ADDTSRESERVE.indication Function

| | |
|---|---|
| Function | MLME-ADDRTATSRESERVE.indication (APAddress, DialogToken, RTA-TSPEC, TCLASS, TCLASProcessing, HigherLayerStreamID) |
| When generated | The MLME of STA generates this message and passes it to its SME when the MLME of STA receives an ADDRTATS reserve request frame |
| Effect of receipt | When the SME of STA receives this message, it needs to initiate a non-AP-initiated RTA-TS setup procedure. |

| Parameters | Name | Type | Description |
|---|---|---|---|
| | APAddress | MAC address | MLME sets this parameter to indicate the MAC address of AP who initiates this AP-initiated RTA-TS setup procedure. When SME receives this information, it initiates a non-AP-initiated RTA-TS setup procedure with the AP. |
| | DialogToken | Integer | Specifies the ADDRTATS reserve transaction |
| | RTA-TSPEC | RTA-TSPEC element as shown in FIG. 7 | MLME indicates the parameters in the RTA-TSPEC element that are set in the ADDRTATS reserve request frame. SME receives this information could send ADDRTATS request frame using those parameters. |
| | TCLASS | TCLAS element as shown in FIG. 3 | MLME indicates the parameters in the TCLASS element that are set in the ADDRTATS reserve request frame. SME receives this information and set the same parameters in the element of the ADDRTATS request frame. |
| | TCLASProcessing | TCLAS Processing element as shown in FIG. 4 | MLME indicates the parameters in the TCLASS Processing element that are set in the ADDRTATS reserve request frame. SME receives this information and set the same parameters in the element of the ADDRTATS request frame. |
| | HigherLayerStreamID | Higher Layer stream ID from higher layer QoS reservation request | MLME indicates the Higher Layer Stream ID that are set in the ADDRTATS reserve request frame. SME receives this information and set the same parameters in the element of the ADDRTATS request frame. |

TABLE 7

Description of MLME-ADDTSRESERVE.response Function

| | |
|---|---|
| Function | MLME-ADDRTATSRESERVE.response (APAddress, DialogToken, HigherLayerStreamID, ResultCode) |
| When generated | The SME of STA generates this message and passes it to its MLME when the SME of STA receives the result of an AP-initiated RTA-TS setup |

TABLE 7-continued

Description of MLME-ADDTSRESERVE.response Function

| | | | |
|---|---|---|---|
| Effect of receipt | When the MLME of STA receives this message, it needs to send an ADDRTATS Reserve response frame. | | |
| Parameters | Name | Type | Description |
| | APAddress | MAC address | SME sets this parameter to indicate the MAC address of AP who initiates this AP-initiated RTA-TS setup procedure. When MLME receives this information, it transmits an ADDRTATS Reserve response frame to the AP. |
| | DialogToken | Integer | Specifies the ADDRTATS reserve transaction |
| | HigherLayerStreamID | Higher Layer stream ID from higher layer QoS reservation request | SME specifies the parameters in the Higher Layer Stream ID element from the upper layer reservation request. This field could be used to map the current RTA-TS setup procedure to the higher layer QoS reservation process. MLME will copy this element in ADDRTATS response request frame. |
| | ResultCode | Enumerator | SME indicates the result of the corresponding RTA-TS setup procedure. The result code could be ACCEPT or REJECT. MLME receives this information and copies it in the ADDRTATS reserve response frame. |

TABLE 8

Description of MLME-ADDTSRESERVE.confirm Function

| | | | |
|---|---|---|---|
| Function | MLME-ADDRTATSRESERVE.confirm (STAAddress, DialogToken, HigherLayerStreamID, ResultCode) | | |
| When generated | The MLME of STA generates this message and passes it to its SME when the MLME of STA receives an ADDRTATS reserve response frame | | |
| Effect of receipt | When the SME of STA receives this message, it needs to inform the result of the corresponding RTA-TS setup result to the higher layer stream reservation procedure. | | |
| Parameters | Name | Type | Description |
| | STAAddress | MAC address | MLME indicates the MAC address of the STA which transmits the ADDRTATS reserve response frame. |
| | DialogToken | Integer | Specifies the ADDRTATS reserve transaction |
| | HigherLayerStreamID | Higher Layer stream ID from higher layer QoS reservation request | MLME specifies the parameters in the Higher Layer Stream ID element from the upper layer reservation request. SME could use this field to map the current RTA-TS setup procedure to the corresponding higher layer QoS reservation process and reports the result. |
| | ResultCode | Enumerator | MLME indicates the result of the corresponding RTA-TS setup procedure which is indicated in the ADDRTATS reserve response frame. |

TABLE 9

TS information for RTA and non-RTA at STA 0 (AP)

| | |
|---|---|
| RTA-TS ID | 1 |
| Node with | STA 1 |
| Traffic Type | 1 |
| Direction | Downlink |
| Priority | 4(RTA) |
| Destination Service | 1 |
| MSDU Lifetime | 11 ms |
| Latency Boundary | 10 ms |
| Reliability | 0.01% |
| Jitter | 5 ms |
| Nominal Service Interval | 10 ms |
| Minimum Service Interval | 8 ms |
| Maximum Service Interval | 12 ms |
| Medium Time | 2 ms |
| Minimum PHY Rate | 54 Mb/s |

What is claimed is:

1. An apparatus for wireless communication in a network, the apparatus comprising:
   (a) a wireless communication circuit, as a station which is either an access point (AP) or non-AP station, configured for wirelessly communicating over at least one channel with at least one other wireless station on a local area network (WLAN) in its reception area;
   (b) a processor coupled to said station configured for operating on the WLAN;
   (c) a non-transitory memory storing instructions executable by the processor; and
   (d) wherein said instructions, when executed by the processor, perform steps of an IEEE 802.11 WLAN protocol in which stations perform different roles in that same IEEE 802.11 protocol, comprising:
      (i) operating said station in a protocol supporting Carrier Sense Multiple Access/Collision Avoidance (CSMA/CA) and which supports communicating real-time application (RTA) packets that are sensitive to communication delays as well as non-real time packets over a network supporting traffic stream (TS) operations in which real time application (RTA) traffic and non-RTA traffic coexist;
      (ii) distinguishing real-time application (RTA) packets from non-real-time application (non-RTA) packets;
      (iii) receiving a request for establishing a traffic stream (TS) for an RTA session from another station on this same network which is operating as an initiator station, as received at the station of the apparatus operating as a responder station; wherein the initiator station and responder station are each either an AP or non-AP station on the IEEE 802.11 network;
      (iv) checking, by said responder station, whether it can satisfy the traffic stream requirement of the RTA session from the initiator station; and
      (v) responding with indications on whether to accept or deny the traffic stream (TS) for the RTA session, by the responder station to the initiator station.

2. The apparatus of claim 1, wherein said traffic stream (TS) represents a set of Medium Access Communication Service Data Units (MSDUs) under the same traffic specification and QoS requirement.

3. The apparatus of claim 1, wherein said traffic stream (TS) is performed in a medium access control (MAC) protocol providing Carrier Sense Multiple Access/Collision Avoidance (CSMA/CA).

4. The apparatus of claim 1, wherein when said request from an initiator station to another station in the local area network (WLAN) for establishment of a traffic stream (TS) for an RTA session is generated, the request indicates that the traffic stream (TS) requires deterministic service.

5. The apparatus of claim 1, wherein when said request from an initiator station to another station in the local area network (WLAN) for establishment of a traffic stream (TS) for an RTA session is generated, the request indicates RTA session requirements selected from the group consisting of latency, jitter and packet loss.

6. The apparatus of claim 1, wherein when said request from an initiator station to another station in the local area network (WLAN) for establishment of a traffic stream (TS) for an RTA session is generated, the request indicates packet lifetime of the traffic stream in the traffic stream request.

7. The apparatus of claim 1, wherein when said request from an initiator station to another station in the local area network (WLAN) for establishment of a traffic stream (TS) for an RTA session is generated, the request indicates an RTA priority in the traffic stream request.

8. The apparatus of claim 1, wherein when said request from an initiator station to another station in the local area network (WLAN) for establishment of a traffic stream (TS) for an RTA session is generated, the request includes a request for the responder station to indicate a reason for denying the traffic stream (TS) request.

9. An apparatus for wireless communication in a network, the apparatus comprising:
   (a) a wireless communication circuit, as a station which is either an access point (AP) or non-AP station, configured for wirelessly communicating over at least one channel with at least one other wireless station on a local area network (WLAN) in its reception area;
   (b) a processor coupled to said station configured for operating on the WLAN;
   (c) a non-transitory memory storing instructions executable by the processor; and
   (d) wherein said instructions, when executed by the processor, perform steps of a WLAN protocol in which stations perform different roles, comprising:
      (i) operating said station, and other stations in the network share the same IEEE 802.11 protocol, supporting Carrier Sense Multiple Access/Collision Avoidance (CSMA/CA) and configured to support communicating real-time application (RTA) packets that are sensitive to communication delays as well as non-real time packets over a network supporting traffic stream (TS) operations in which real time application (RTA) traffic and non-RTA traffic coexist;
      (ii) distinguishing real-time application (RTA) packets from non-real-time application (non-RTA) packets;
      (iii) receiving a request for establishing the traffic stream (TS) for an RTA session from another station operating on this same network as an initiator station, at a station of the apparatus operating as a responder station; wherein the initiator station and responder station are each either an AP or non-AP station on the IEEE 802.11 network; wherein said traffic stream (TS) represents a set of Medium Access Communication Service Data Units (MSDUs) under the same traffic specification and QoS requirement;
      (iv) checking, by said responder station, whether it can satisfy the traffic stream requirement of the RTA session from the initiator station;
      (v) responding with indications on whether to accept or deny the traffic stream (TS) for the RTA session, by said responder station to the initiator station; and
      (vi) establishing said traffic stream (TS) in a medium access control (MAC) protocol which provides Carrier Sense Multiple Access/Collision Avoidance (CSMA/CA).

10. The apparatus of claim 9, wherein when said request from an initiator station to another station in the local area network (WLAN) for establishment of a traffic stream (TS) for an RTA session is generated, the request indicates that the traffic stream (TS) requires deterministic service.

11. The apparatus of claim 9, wherein when said request from an initiator station to another station in the local area network (WLAN) for establishment of a traffic stream (TS) for an RTA session is generated, the request indicates RTA session requirements selected from the group consisting of latency, jitter and packet loss.

12. The apparatus of claim 9, wherein when said request from an initiator station to another station in the local area network (WLAN) for establishment of a traffic stream (TS) for an RTA session is generated, the request indicates packet lifetime of the traffic stream in the traffic stream request.

13. The apparatus of claim 9, wherein when said request from an initiator station to another station in the local area network (WLAN) for establishment of a traffic stream (TS) for an RTA session is generated, the request indicates an RTA priority in the traffic stream request.

14. The apparatus of claim 9, wherein when said request from an initiator station to another station in the local area network (WLAN) for establishment of a traffic stream (TS) for an RTA session is generated, the request includes a request for the responder station to indicate a reason for denying the traffic stream (TS) request.

15. A method of performing wireless communication between wireless communications circuits over a network, comprising:
 (a) operating wireless communication circuits as stations in a wireless local area network (WLAN) executing a single communications protocol under IEEE 802.11 that support Carrier Sense Multiple Access/Collision Avoidance (CSMA/CA) in which stations perform different roles in communicating real-time application (RTA) packets that are sensitive to communication delays as well as non-real time packets over a network supporting within traffic stream (TS) operations in which real time application (RTA) traffic and non-RTA traffic coexist;
 (b) distinguishing real-time application (RTA) packets from non-real-time application (non-RTA) packets;
 (c) generating a request from an initiator station to another station in the local area network (WLAN) requesting establishment of a traffic stream (TS) for an RTA session;
 (d) receiving the request for establishing a traffic stream from the initiator station on this same network, at a station operating as a responder station; wherein the initiator station and responder station are each either an AP or non-AP station on the IEEE 802.11 network;
 (e) checking, by said responder station, whether it can satisfy the traffic stream requirement of the RTA session; and
 (f) responding, by said responder station, to the initiator station indicating whether it will accept or deny the traffic stream (TS) for the RTA session.

16. The method of claim 15, further comprising indicating within said request for establishment of a traffic stream (TS) for the RTA session that the traffic stream (TS) requires deterministic service.

17. The method of claim 15, further comprising indicating RTA session requirements in the traffic stream request, where said RTA session requirements are selected from a group of session requirements consisting of latency, jitter and packet loss when requesting establishment of a traffic stream (TS) for the RTA session.

18. The method of claim 15, further comprising indicating packet lifetime of the traffic stream in the traffic stream request when requesting establishment of a traffic stream (TS) for the RTA session.

19. The method of claim 15, further comprising indicating an RTA priority in the traffic stream request, when requesting establishment of a traffic stream (TS) for the RTA session.

20. The method of claim 15, further comprising said responder station incorporating an indication of the reason for denying a traffic stream (TS) request by the initiator station.

* * * * *